(12) United States Patent
Morishima et al.

(10) Patent No.: US 6,713,147 B2
(45) Date of Patent: Mar. 30, 2004

(54) OPTICAL INFORMATION-RECORDING MEDIUM AND OPTICAL INFORMATION-RECORDING METHOD

(75) Inventors: Shinnichi Morishima, Kanagawa (JP); Michihiro Shibata, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/077,931

(22) Filed: Feb. 20, 2002

(65) Prior Publication Data

US 2003/0064205 A1 Apr. 3, 2003

(30) Foreign Application Priority Data

Feb. 21, 2001 (JP) ........................................ 2001-045091

(51) Int. Cl.$^7$ ................................................. B32B 3/02

(52) U.S. Cl. ................. 428/64.1; 428/64.8; 430/270.14

(58) Field of Search .............................. 428/64.1, 64.4, 428/64.8, 913; 430/270.14, 270.15, 495.1, 945

(56) References Cited

U.S. PATENT DOCUMENTS

| 4,656,121 A | 4/1987 | Sato et al. | |
|---|---|---|---|
| 2001/0055728 A1 * | 12/2001 | Shibata ................... | 430/270.1 |

FOREIGN PATENT DOCUMENTS

| EP | 0 833 314 A2 | 4/1998 |
|---|---|---|
| EP | 0 962 923 A1 | 12/1999 |
| JP | 63-209995 | 8/1988 |
| JP | 11-138998 | 5/1999 |

OTHER PUBLICATIONS

European Search Report dated Jul. 11, 2002.
Abstract of JP 11–138998 A.

* cited by examiner

*Primary Examiner*—Elizabeth Mulvaney
(74) *Attorney, Agent, or Firm*—Sughrue Mion, PLLC

(57) ABSTRACT

An information-recording medium comprising a substrate having thereon a recording layer capable of recording information with laser light, said recording layer containing: at least one compound selected from the group consisting of compounds represented by the following general formulae (I-1), (I-2), (I-3) and (I-4); and an organic dye other than said compounds.

General formula (I-1)

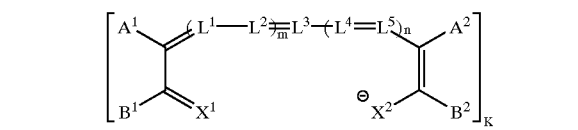
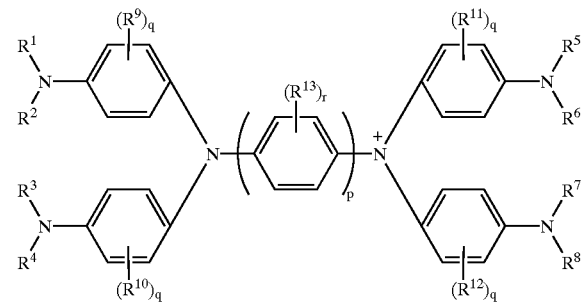

General formula (I-2)

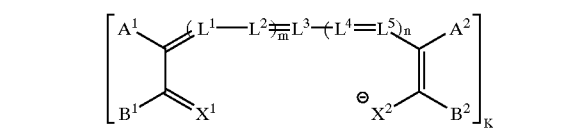
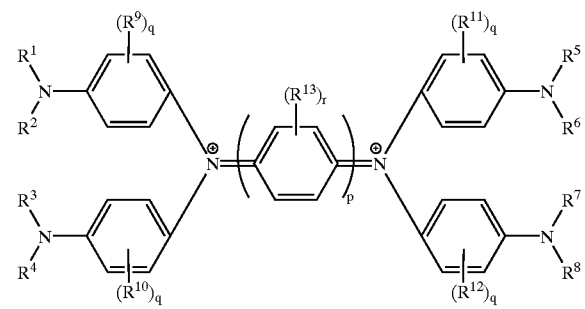

General formula (I-3)

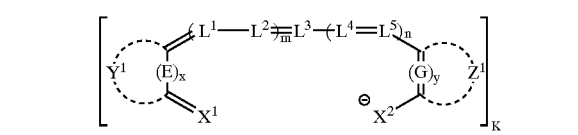
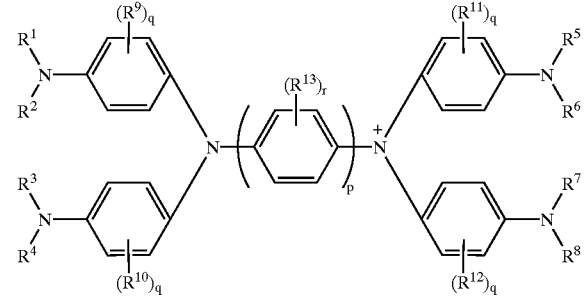

General formula (I-4)

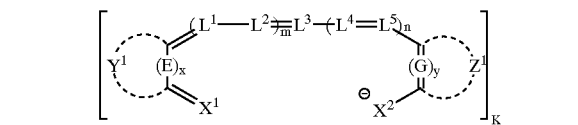

-continued
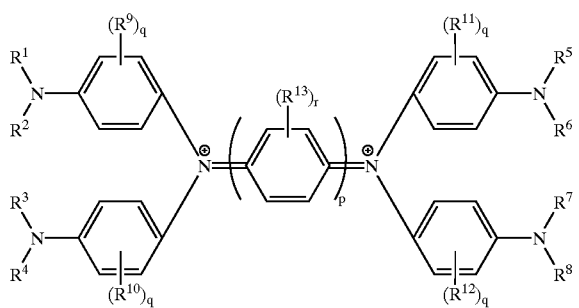
The symbols in the above formulae are defined in the specification.
6 Claims, No Drawings

OPTICAL INFORMATION-RECORDING MEDIUM AND OPTICAL INFORMATION-RECORDING METHOD

FIELD OF THE INVENTION

The present invention relates to an optical information-recording medium and an optical information-recording method. Particularly, the invention relates to an optical information-recording medium of recordable type that comprises a recording layer containing an oxonol dye and is capable of recording and reproducing information with laser irradiation, and to a method of optical recording information using the optical information-recording medium.

BACKGROUND OF THE INVENTION

Conventionally, information-recording media (optical disc) capable of recording just once with laser light are well known. Such information-recording media are also called recordable CD (CD-R), which have an advantage that they can rapidly produce few numbers of CD's at a reasonable cost compared with the conventional manufacturing method for CD. Owing to this advantage, the market demand for CD-R is increasing along with the prevalence of the personal computer. As for a typical structure of the information-recording medium of CD-R type, on a transparent disk as the substrate, a recording layer comprising an organic dye, a reflection layer comprising a metal such as gold or silver, and a resinous protective layer are superimposed in this order. Information is recorded on such an optical disk by directing a near-infrared laser beam (usually having a wavelength around 780 nm) on the disk to cause a local deformation of the recording layer by the generated heat. On the other hand, the read-out (reproduction) of the information is performed by irradiating the laser light having the same wavelength as that used for recording whereby the difference in reflectance between the deformed (recorded) region and the non-deformed (unrecorded) region is detected.

In recent years, information recording media of higher recording densities are demanded. To raise recording density, it is effective to reduce the beam diameter of the irradiated laser. Since the beam diameter of a laser light can be made smaller for a shorter wavelength, it is theoretically deduced that the use of a shorter wavelength laser is advantageous for a higher recording density. Hence, optical disks that are recorded and read-out with lasers of shorter wavelengths than 780 nm that has been conventionally adopted are now being developed. For example, an optical disk called recordable digital versatile disk (DVD-R) has been proposed, in which a pre-groove with a track pitch of 0.7 to 0.8 am narrower than that for CD-R (1.6 $\mu$m) is formed on a transparent disk substrate of 120 mm or 80 mm diameter. The DVD-R comprises a unit disk comprising the substrate having thereon a recording layer containing a dye, and usually a reflection layer and a protective layer provided on the recording layer. The DVD-R is produced by laminating two unit disks with each other, or one unit disk with a transparent protective disk of substantially the same dimensions as those of the unit disk, using an adhesive with the respective recording layer(s) inside relative to the respective substrate(s). For the DVD-R, information recording and read-out are carried out with use of a visible laser light (usually of a wavelength between 600 and 700 nm). Accordingly, it is said that the DVD-R type optical disk can achieve a higher recording density than the CD-R type optical disk.

The information-recording medium of the DVD-R type, which can store information several times larger than the conventional CD-R, is desired to have not only a high recording sensitivity, but also a low error rate for a high-speed recording, particularly, from the standpoint of the need to rapidly treat a large amount of information. Further, recording layers that can maintain a consistent and stable performance under the actions of heat and light over an extended period are demanded since the conventional dye-based recording layers are not sufficiently stable against heat and light over a long period.

Japanese Patent Laid-Open No. 209995/1988 discloses a CD-R type information-recording medium comprising a recording layer containing an oxonol dye provided on a substrate. It is disclosed therein that stable recording and read-out characteristics over a long period can be attained by the use of the compound. In this publication, an oxonol dye compound having ammonium introduced in its molecule in the form of a salt is disclosed.

The present inventors applied the oxonol dye set forth in the above-noted publication to the DVD-R type recording medium and investigated the characteristics thereof. The investigation results indicated that the recording and reproduction characteristics of the recording medium having the oxonol dye-based recording layer are not satisfactory since the reflectance and the degree of modulation are low. Moreover, the medium exhibited an insufficient light-fastness, often causing regeneration failure when exposed to light such as sunlight for a long period. On the other hand, Japanese Patent Laid-Open 138998/1999 discloses an optical information-recording medium having a recording layer comprising an oxonol dye which is salt-bonded with a diimmonium acting as a singlet oxygen quencher. It is disclosed therein that the medium can keep stable recording and read-out characteristics even under a prolonged exposure to sunlight. However, it was found that the optical information-recording medium having a recording layer which is composed of solely the oxonol dye tends to cause read-out failure under storage conditions of high temperature and high humidity and hence has an insufficient resistance against moisture and heat.

SUMMARY OF THE INVENTION

Accordingly, an object of the invention is to provide an information-recording medium which is suitably used for information recording and regeneration with use of a visible laser, and which has high recording characteristics and such a high stability that can adequately maintain the recording characteristics over a long period of time (particularly, even under high temperature and high humidity conditions).

Another object of the invention is to provide an information recording method using the information-recording medium.

Other objects and effects of the invention will become apparent from the following description.

The above-described objects of the invention have been achieved by providing an information-recording medium comprising a substrate having thereon a recording layer capable of recording information with laser light, said recording layer containing: at least one compound selected from the group consisting of compounds represented by the following general formulae (I-1), (I-2), (I-3) and (I-4); and an organic dye other than said compounds:

General formula (I-1)

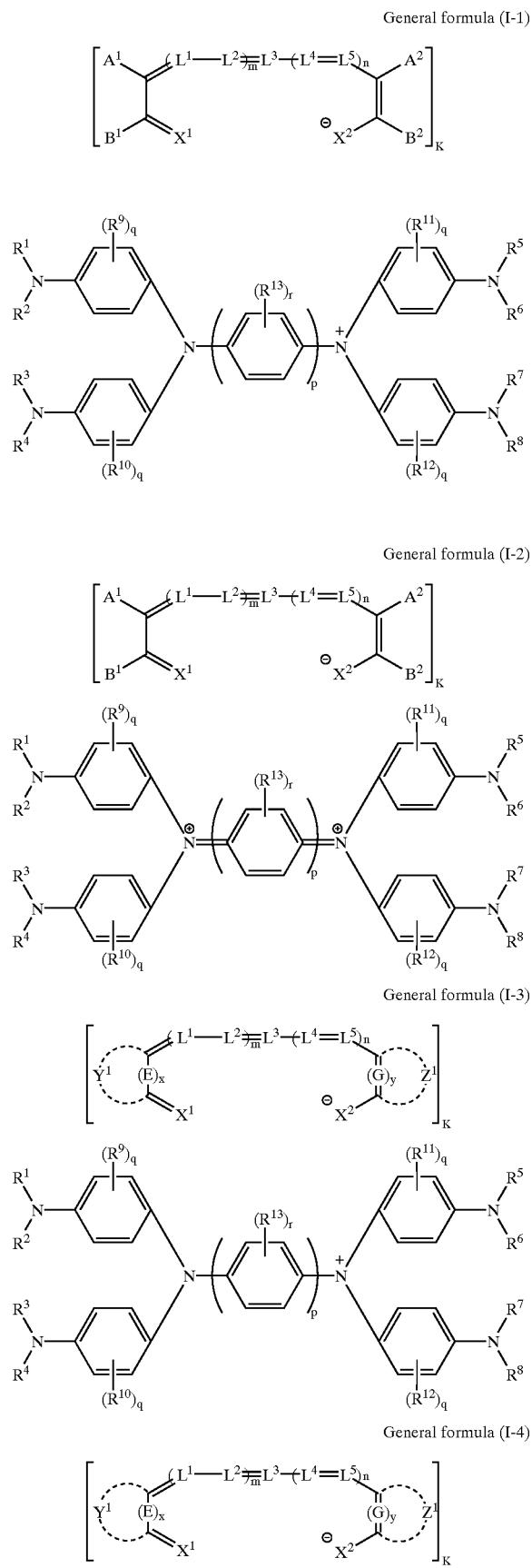

General formula (I-2)

General formula (I-3)

General formula (I-4)

-continued

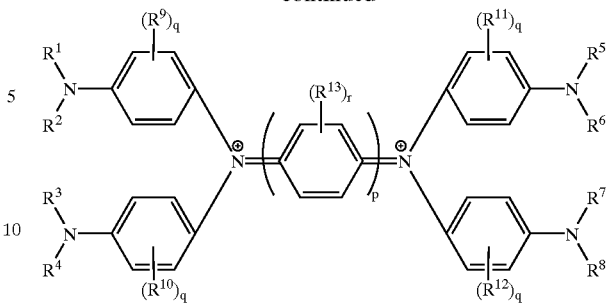

wherein $A^1$, $A^2$, $B^1$ and $B^2$ each independently represents a substituent; $Y^1$ and $Z^1$ each independently represents an atomic group necessary to form a carbocyclic or heterocyclic ring; E and G each independently represents an atomic group necessary to complete a conjugated double bond chain; $X^1$ represents =O, =NR or =C(CN)$_2$; $X^2$ represents —O, —NR or —C(CN)$_2$ (wherein R represents a substituent); $L^1$, $L^2$, $L^3$, $L^4$ and L each independently represents a methine group which may be substituted; m and n each independently represents 0, 1 or 2; x and y each independently represents 0 or 1; and K represents an integer needed to neutralize the charge of the counter cation; $R^1$, $R^2$, $R^3$, $R^4$, $R^5$, $R^6$, $R^7$ and $R^8$ each independently represents a hydrogen atom or a substituent (wherein each pair of $R^1$ and $R^2$, $R^3$ and $R^4$, $R^5$ and $R^6$, and $R^7$ and $R^8$ may combine with each other to form a heterocyclic ring together with the nitrogen atom); $R^9$, $R^{10}$, $R^{11}$, $R^{12}$ and $R^{13}$ each independently represents a substituent; p represents 1 or 2; and q and r each independently represents an integer of 0 to 4.

The information-recording medium of the invention has a feature that the recording layer, which is provided on the substrate and which is capable of recording information by the exposure to laser light, contains at least one compound represented by the above cited general formulae (I-1), (I-2), (I-3) or (I-4) and an organic dye other than the compound. The medium can exhibit excellent recording characteristics not only for the laser light in the wavelength region used for CD-R, but also for a shorter wavelength laser light used for DVD-R by using organic dyes as the recording layer dye and appropriately selecting organic dyes having a different absorption wavelength distribution depending on the wavelength of the recording light. Moreover, by using at least one compound represented by general formulae (I-1), (I-2), (I-3) or (I-4) in combination with the organic dye, not only the light-fastness is improved, but desirable recording and regeneration characteristics can be secured for a long period of time even under high temperature and high humidity conditions. In other words, an optical information-recording medium having excellent stability can be obtained.

In general formulae (I-1), (I-2), (I-3) and (I-4), it is preferred that $R^1$, $R^2$, $R^3$, $R^4$, $R^5$, $R^6$, $R^7$ and $R^8$ each independently represents a hydrogen or halogen atom, an alkyl group having 1 to 8 carbon atoms, an alkenyl group having 2 to 8 carbon atoms, an alkynyl group having 2 to 8 carbon atoms, an aryl group having 6 to 10 carbon atoms, an aralkyl group having 7 to 10 carbon atoms, or an alkoxy group having 1 to 8 carbon atoms, and it is also preferred that $X^1$ is =O and $X^2$ is —O.

The organic dye is preferably a cyanine or oxonol dye, more preferably an oxonol dye, and particularly preferably a compound represented by the following general formula (II):

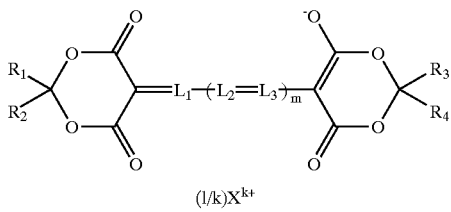

wherein $R_1$, $R_2$, $R_3$ and $R_4$ each independently represents a hydrogen atom, an alkyl group, an aryl group, an aralkyl group or a heterocyclic group, $L_1$, $L_2$ and $L_3$ each independently represents a methine group which may be substituted, m represents 0, 1, 2 or 3, and $X^{k+}$ represents a cation wherein k represents an integer of 1 to 10.

In the above general formula (II), $X^{k+}$ is preferably a quaternary ammonium ion, and more preferably an onium ion represented by the following general formula (II-1):

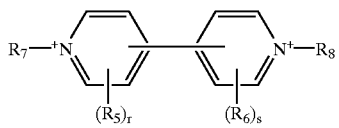

wherein $R_5$ and $R_6$ each independently represents a substituent, $R_7$ and $R_8$ each independently represents an alkyl group, an alkenyl group, an alkynyl group, an aralkyl group, an aryl group or a heterocyclic group, each pair of $R_5$ and $R_6$, $R_5$ and $R_7$, $R_6$ and $R_8$, and $R_7$ and $R_8$ may connect each other to form a ring, r and s each independently represents an integer of 0 to 4, and when r and s are not smaller than 2, the plural $R_5$'s and $R_6$'s may be the same or different.

The optical information-recording medium of the invention can have a structure comprising a transparent disk substrate having a pre-groove with a constant track pitch, and a recording layer provided on the side of the substrate in which the pre-groove has been formed. On the recording layer may be provided a light-reflecting layer made of a metal, and further above the recording layer may be provided a protective layer.

The optical information recording method of the invention comprises recording information on the above-described optical information-recording medium by irradiating with a laser light having a wavelength in a range of 750 to 850 nm or a range of 600 to 700 nm. A variety of organic dyes can be designed to have excellent recording and reproduction characteristics for both of the wavelength region of 750 to 850 nm and the wavelength region of 600 to 700 nm. The optical information-recording medium of the invention can perform stable recording with good recording and reproduction characteristics over a long period of time by appropriately selecting organic dyes having a different absorption wavelength distribution depending on the wavelength of the recording light.

DETAILED DESCRIPTION OF THE INVENTION

The optical information-recording medium and optical information-recording method of the invention are described in detail below.

The optical information-recording medium of the invention comprises a substrate and provided thereon a recording layer which is capable of recording information with use of a laser light. The recording layer contains at least one compound represented by the following general formulae (I-1), (I-2), (I-3) or (I-4) and an organic dye other than the compounds of these formulae.

General formula (I-1)

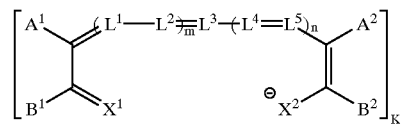

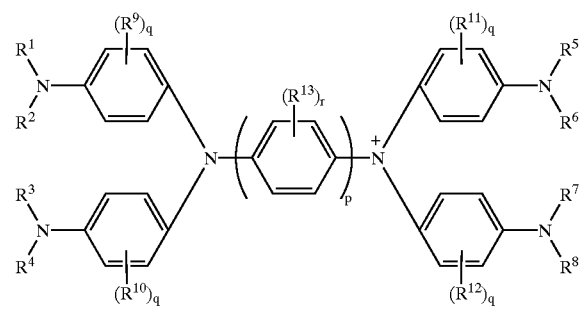

General formula (I-2)

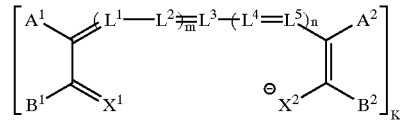

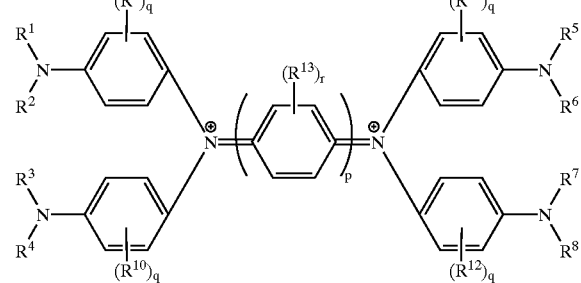

General formula (I-3)

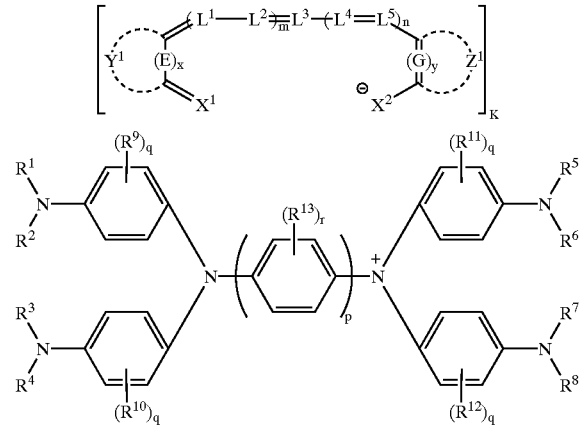

-continued

General formula (I-4)

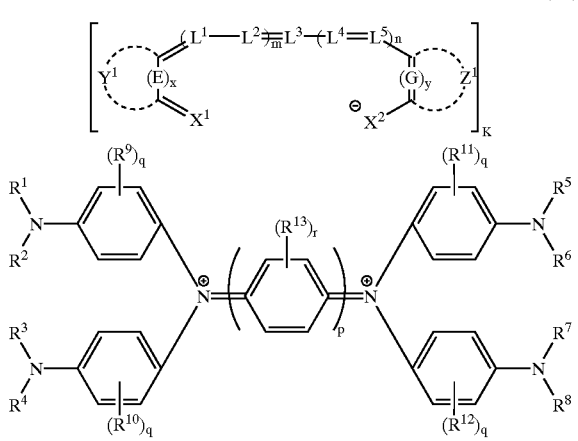

In the above formulae, $A^1$, $A^2$, $B^1$ and $B^2$ each independently represents a substituent, $Y^1$ and $Z^1$ each independently represents an atomic group necessary to form a carbocyclic or heterocyclic ring; E and G each independently represents an atomic group necessary to complete a conjugated double bond chain; $X^1$ represents =O, =NR or =C(CN)$_2$; $X^2$ represents —O, —NR or —C(CN)$_2$ (R represents a substituent); $L^1$, $L^2$, $L^3$, $L^4$ and $L^5$ each independently represents a methine group which may be substituted; m and n each independently represents 0, 1 or 2; x and y each independently represents 0 or 1, and K represents an integer needed to neutralize the charge of the counter cation; $R^1$, $R^2$, $R^3$, $R^4$, $R^5$, $R^6$, $R^7$ and $R^8$ each independently represents a hydrogen atom or a substituent (Each pair of $R^1$ and $R^2$, $R^3$ and $R^4$, $R^5$ and $R^6$, and $R^7$ and $R^8$ may combine with each other to form a heterocyclic ring together with the nitrogen atom); $R^9$, $R^{10}$, $R^{11}$, $R^{12}$, and $R^{13}$ each independently represents a substituent; p represents 1 or 2; and q and r each independently represents an integer of 0 to 4.

The compounds represented by the above general formulae (I-1), (I-2), (I-3) and (I-4) are further explained below.

The compound for use in the invention comprises an anionic component (hereinafter simply referred to as "anionic part") which is an oxonol dye component and a cationic component (hereinafter simply referred to as 'cationic part'). The anionic part (i.e., oxonol dye component) is now explained. In the above formulae, the substituents represented by $A^1$, $A^2$, $B^1$ and $B^2$ include, for example, the following; a substituted or unsubstituted, straight, branched or cyclic alkyl group having 1 to 18 (preferably 1 to 8) carbon atoms (e.g., methyl, ethyl, propyl, isopropyl, n-butyl, isobutyl, sec-butyl, t-butyl, cyclohexyl, methoxyethyl, ethoxyocarbonylethyl, cyanoethyl, diethylaminoethyl, hydroxyethyl, chloroethyl, acetoxyethyl and trifluoromethyl); an alkenyl group having 2 to 18 (preferably 2 to 8 carbon atoms (e.g., vinyl); an alkynyl group having 2 to 18 (preferably 2 to 8) carbon atoms (e.g., ethynyl); a substituted or unsubstituted aryl group having 6 to 18 (preferably 6 to 10) carbon atoms (e.g., phenyl, 4-methylphenyl, 4-methoxyphenyl, 4-carboxyphenyl and 3,5-dicarboxyphenyl); a substituted or unsubstituted aralkyl group having 7 to 18 (preferably 7 to 12) carbon atoms (e.g., benzyl and carboxybenzyl); a substituted or unsubstituted acyl group having 2 to 18 (preferably 2 to 8) carbon atoms (e.g., acetyl, propyonyl, butanoyl and chloroacetyl); a substituted or unsubstituted alkylsulfonyl or arylsulfonyl group having 1 to 18 (preferably 1 to 8) carbon atoms (e.g., methanesulfonyl and p-toluenesulfonyl); an alkylsulfinyl group having 1 to 18 (preferably 1 to 8) carbon atoms (e.g., methanesulfinyl, ethanesulfinyl and octanesulfinyl); an alkoxycarbonyl group having 2 to 18 (preferably 2 to 8) carbon atoms (e.g., methoxycarbonyl and ethoxycarbonyl); an aryloxycarbonyl group having 7 to 18 (preferably 7 to 12) carbon atoms (e.g., phenoxycarbonyl, 4-methylphenoxycarbonyl and 4-methoxyphenylcarbonyl); a substituted or unsubstituted alkoxy group having 1 to 18 (preferably 1 to 8) carbon atoms (e.g., methoxy, ethoxy, n-butoxy and methoxyethoxy); a substituted or unsubstituted aryloxy group having 6 to 18 (preferably 6 to 10) carbon atoms (e.g., phenoxy and 4-methoxyphenoxy); an alkylthio group having 1 to 18 (preferably 1 to 8) carbon atoms (e.g., methylthio and ethylthio); an arylthio group having 6 to 10 (preferably 6 to 8) carbon atoms (e.g., phenylthio); a substituted or unsubstituted acyloxy group having 2 to 18 (preferably 2 to 8) carbon atoms (e.g., acetoxy, ethylcarbonyloxy, cyclohexylcarbonyloxy, benzoyloxy and chloroacetyloxy); a substituted or unsubstituted sulfonyloxy group having 1 to 18 (preferably 1 to 8) carbon atoms (e.g., methanesulfonyloxy); a substituted or unsubstituted carbamoyloxy group having 2 to 18 (preferably 2 to 8) carbon atoms (e.g., methylcarbamoyloxy and diethylcarbamoyloxy); unsubstituted amino group or a substituted amino group having 1 to 18 (preferably 1 to 8) carbon atoms (e.g., methylamino, dimethylamino, diethylamino, anilino, methoxyphenylamino, chlorophenylamino, pyridylamino, methoxycarbonylamino, n-butoxycarbonylamino, phenoxycarbonylamino, methylcarbamoylamino, phenylcarbamoylamino, ethylthiocarbamoylamino, methylsulfamoylamino, phenylsufamoylamino, acetylamino, ethylcarbonylamino, ethylthiocarbonylamino, cyclohexylcarbonylamino, benzoylamino, chloroacetylamino, methanesulfonylamino and benzenesulfonylamino); an amido group having 1 to 18 (preferably 1 to 8) carbon atoms (e.g., acetoamido, acetylmethylamido and acetyloctylamido); a substituted or unsubstituted ureido group having 1 to 18 (preferably 1 to 8) carbon atoms (e.g., unsubstituted ureido, methylureido, ethylureido and dimethylureido); an unsubstituted or substituted carbamoyl group having 1 to 18 (preferably 1 to 8) carbon atoms (e.g., unsubstituted carbamoyl, methylcarbamoyl, ethylcarbamoyl, n-butylcarbamoyl, t-butylcarbamoyl, dimethylcarbamoyl, morpholinocarbamoyl and pyrrolidinocarbamoyl); an unsubstituted sulfamoyl group or a substituted sulfamoyl group having 1 to 18 (preferably 1 to 8) carbon atoms (e.g., methylsulfamoyl and phenylsulfamoyl); a halogen atom (e.g., fluorine, chlorine and bromine); hydroxy group; nitro group; cyano group; carboxyl group; and a heterocyclic group (e.g., oxazole ring, benzoxazole ring, thiazole gring, benzothiazole ring, imidazole ring, benzimidazole ring, indolenine ring, pyridine ring, morpholine ring, piperidine ring, pyrrolidine ring, sulfolane ring, furan ring, thiophene ring, pyrazole ring, pyrrole ring, chroman ring and coumarine ring).

The substituent represented by $A^1$ and $A^2$ preferably has a Hammett's substituent constant (σp) not less than 0.2. The Hammett's substituent constants are given in, for example, Chem. Rev., 91, 165 (1991). Particularly preferable substituents include cyano, nitro, alkoxycarbonyl, acyl, carbamoyl, sulfamoyl, alkylsulfonyl and arylsulfonyl groups.

The substituent represented by $B^1$ and $B^2$ is preferably an alkyl group, an aryl group, an alkoxy group or an amino group.

Since the structure [—C(=L$^1$)—(E)$_x$—C(=X$^1$)—] (hereinafter referred to as $W^1$ for convenience) that combines to $Y^1$ and the structure [—C(=$L^5$)—(G)$_y$—C(=$X^2$)—] (hereinafter referred to $W^2$ for convenience) that combines to $Z^1$ are each conjugated, the carbo- or hetero-cyclic ring completed by $Y^1$ and $W^1$, and the carbo- or hetero-cyclic ring completed by $Z^1$ and $W^2$ each is regarded as one of the resonance structures. The carbo- or hetero-cyclic ring completed by $Y^1$ and $W^1$, or $Z^1$ and $W^2$ is preferably 4- to 7-membered, more preferably 5- or 6-membered. Each of these rings may further condense with another 4- to 7-membered ring to form a condensed ring, which may have a substituent. The substituent includes, for example, those enumerated as represented by $A^1$, $A^2$, $B^1$ and $B^2$. Preferable heteroatoms forming the heterocycle include B, N, O, S, Se and Te. Especially preferable atoms are N, O and S. x and y each independently represents 0 or 1, preferably the both being 0.

$X^1$ represents =O, =NR or =C(CN)$_2$. $X^2$ represents —O, —NR or —C(CN)$_2$. R represents a substituent, which includes those represented by $A^1$, $A^2$, $B^1$ and $B^2$. R is preferably an aryl group, and especially preferably phenyl. In the invention, the case where $X^1$ is =O and $X^2$ is —O is preferred.

The carbocyclic group completed by $Y^1$ and $W^1$ or $Z^1$ and $W^2$ includes, for example, those enumerated below, in which Ra and Rb each independently represents a hydrogen atom or a substituent.

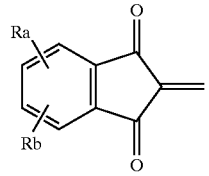

A-1

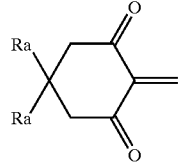

A-2

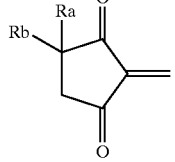

A-3

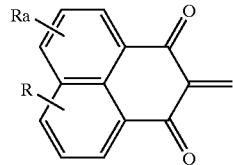

A-4

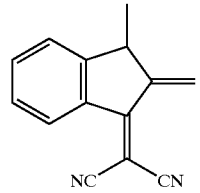

A-5

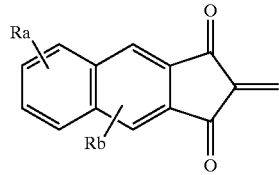

A-6

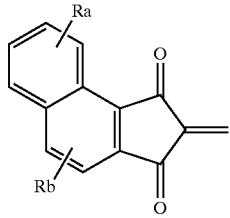

A-7

Preferable carbocycles are those represented by A-1, A-2, A-4, A-6 and A-7, among which those represented by A-1 and A-2 are particularly preferred.

The heterocyclic group completed by $Y^1$ and $W^1$ or $Z^1$ and $W^2$ includes, for example, those enumerated below, in which Ra, Rb and Rc each independently represents a hydrogen atom or a substituent.

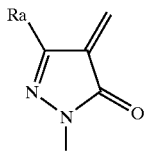

A-8

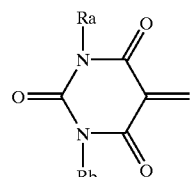

A-9

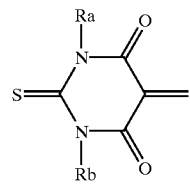

A-10

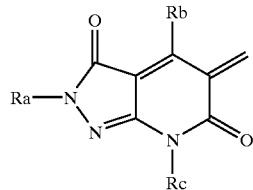

A-11

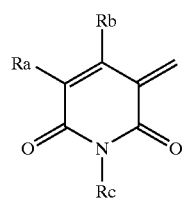

A-12

-continued
A-13 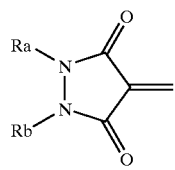
A-14 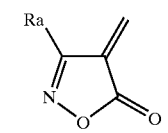
A-15 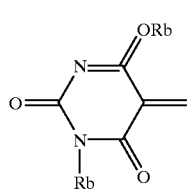
A-16 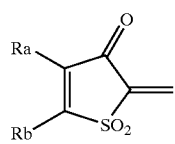
A-17 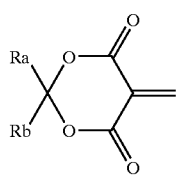
A-18 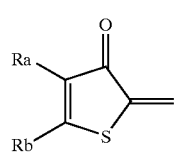
A-19 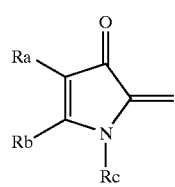
A-20 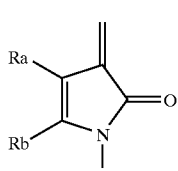
A-21 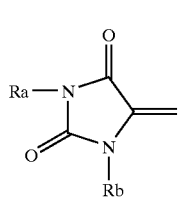
-continued
A-22 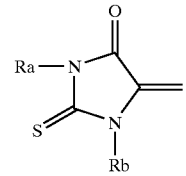
A-23 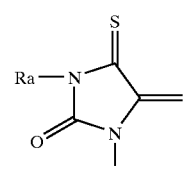
A-24 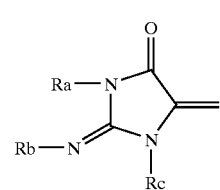
A-25 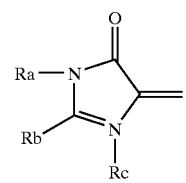
A-26 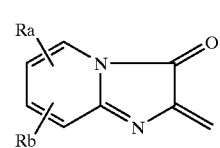
A-27 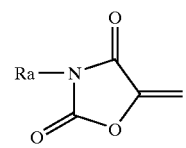
A-28 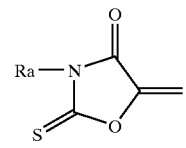
A-29 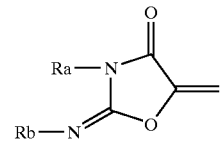
A-30 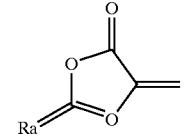

A-31 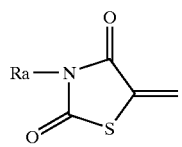
A-32 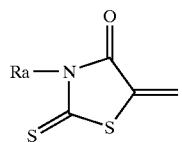
A-33 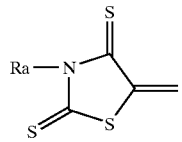
A-34 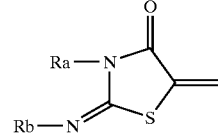
A-35 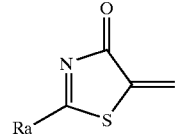
A-36 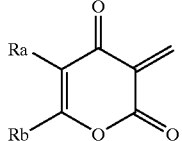
A-37 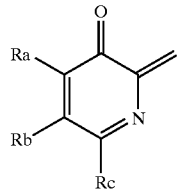
A-38 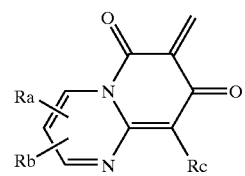
A-39 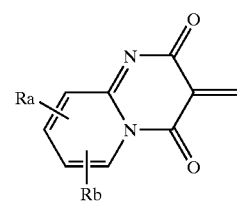
A-40 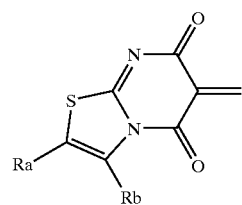
A-41 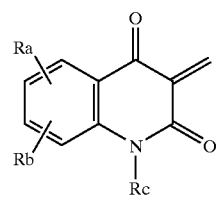
A-42 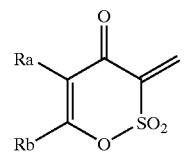
A-43 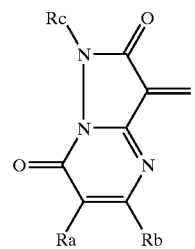
A-44 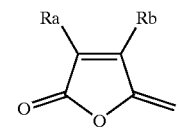
A-45
A-46 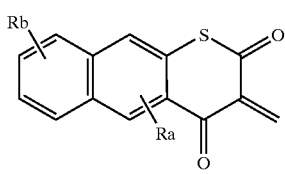
A-47 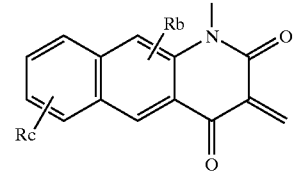

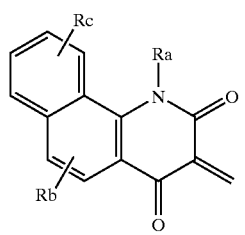

A-48

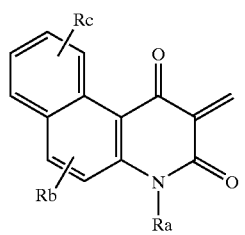

A-49

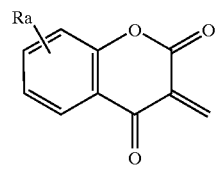

A-50

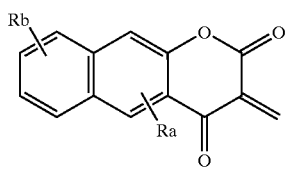

A-51

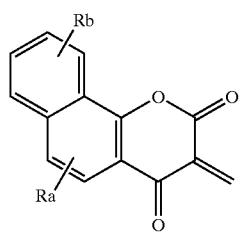

A-52

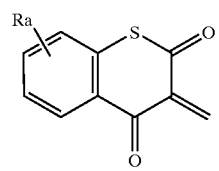

A-53

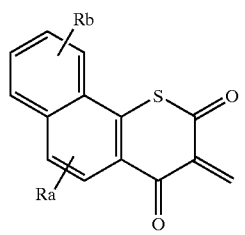

A-54

Preferable heterocycles are those represented by A-$^8$, A-$^9$, A-$^{10}$, A-$^{12}$, A-$^{13}$, A-$^{14}$, A-$^{16}$, A-$^{17}$, A-$^{36}$ and A-$^{45}$, among which those represented by A-$^9$, A-$^{10}$, A-$^{12}$, A-$^{14}$, A-$^{16}$ and A-$^{17}$ are particularly preferred.

The substituents represented by Ra, Rb or Rc are the same as those represented by $A^1$, $A^2$, $B^1$ and $B^2$. Alternatively, Ra, Rb and Rc each may combine with each other to form a carbo- or hetero-cyclic ring. The carbocyclic rings include, for example, 4- to 7-membered, saturated or unsaturated ones, such as cyclohexyl, cyclopentyl, cyclohexene and benzene. The heterocyclic rings include, for example, 4- to 7-membered, saturated or unsaturated ones such as piperidine, piperazine, morpholine, tetrahydofuran, furan, thiophene, pyridine and pyrazine. The substituents for these rings are the same as those represented by $A^1$, $A^2$, $B^1$ and $B^2$ set forth previously.

The methine groups represented by $L^1$, $L^2$, $L^3$, $L^4$ and $L^5$ each independently can have a substituent. The substituent includes, for example, those represented by $A^1$, $A^2$, $B^1$ and $B^2$ mentioned previously. Preferable substituents include an alkyl group, an aralkyl group, an aryl group, an alkoxy group, an aryloxy group, an alkylthio group, an arylthio group, a halogen atom, an amino group, a carbamoyl group and a heterocyclic group. Two substituents may connect together to form a 5- to 7-membered ring (e.g., cyclopentene, 1-dimethylaminocyclopentene, 1-diphenylaminocyclopentene, cyclohexene, 1-chlorocyclohexene, isophorone, 1-morpholinocyclopentene and cycloheptene). As the combination of m and n, both of m and n of 1, m of 0 with n of 2, or m of 2 with n of 0 are preferred. K represents an integer necessary to neutralize the counter cation.

Now, the cationic part is described in detail. $R^1$, $R^2$, $R^3$, $R^4$, $R^5$, $R^6$, $R^7$ and $R^8$ each independently represent a hydrogen atom or a substituent. Further, each pair of $R^1$ and $R^2$, $R^3$ and $R^4$, $R^5$ and $R^6$, and $R^7$ and $R^8$ may combine with each other to form a heterocyclic ring. $R^9$, $R^{10}$, $R^{11}$, $R^{12}$ and $R^{13}$ each represent a substituent. p represents 1 or 2, and q and r each independently represents an integer of 0 to 4.

The substituent represented by $R^1$, $R^2$, $R^3$, $R^4$, $R^5$, $R^6$, $R^7$ and $R^8$ includes, for example, those represented by $A^1$, $A^2$, $B^1$ and $B^2$ given in the description of the anionic part in general formulae (I-1), (I-2), (I-3) and (I-4). Preferable examples of the substituents represented by $R^1$ to $R^8$ include a hydrogen atom, a halogen atom (e.g., F, Cl and Br), an alkyl group having 1 to 8 carbon atoms (e.g., methyl, ethyl, propyl, isopropyl, n-butyl, isobutyl, sec-butyl, t-butyl, pentyl, hexyl, heptyl and octyl), an alkenyl group having 2 to 8 carbon atoms (e.g., vinyl, allyl and 2-methylbutenyl), an alkynyl group having 2 to 8 carbon atoms (e.g., ethynyl), a aryl group having 6 to 10 carbon atoms (e.g., phenyl), an aralkyl group having 7 to 10 carbon atoms (e.g., benzyl) and an alkoxy group having 1 to 8 carbon atoms (e.g., methoxy and ethoxy). Among the substituent groups enumerated above and represented by $R^1$ to $R^8$, substituted or unsubstituted alkyl groups having 1 to 6 carbon atoms are particularly preferred.

The groups cited above may be substituted, if possible, with, for example, a hydroxy group, a halogen atom (e.g., F, Cl and Br), an alkoxy group having 1 to 8 carbon atoms (e.g., methoxy and ethoxy), an aryloxy group having 6 to 10 carbon atoms (e.g., phenoxy), an alkylthio group having 1 to 8 carbon atoms (e.g., methylthio and ethylthio), an arylthio group having 6 to 10 carbon atoms (e.g., phenylthio), an unsubstituted amino group, an amino group having 1 to 8 carbon atoms (e.g., methylamino and dimethylamino), a carbonamide group having 1 to 8 carbon atoms (e.g., methylcarbonylamido), a sulfonamide group having 1 to 8 carbon atoms (e.g., methanesulfonamide), an acyl group having 1 to 8 carbon atoms (e.g., acetyl and butanoyl), an alkoxycarbonyl group having 2 to 8 carbon atoms (e.g., methoxycarbonyl), a carbamoyl group having 1 to 8 carbon atoms (e.g., carbamoyl) and cyano group.

The heterocyclic ring formed by the linkage of $R^1$ and $R^2$, $R^3$ and $R^4$, $R^5$ and $R^6$, or $R^7$ and $R^8$ together with the respective nitrogen atom is preferably an unsubstituted 4- to 7-membered one. More preferably, the ring is a 5- or 6-membered one. Preferable heterocyclic rings include pyrrolidine, piperidine and morpholine. Among them, particularly preferable one is piperidine ring.

The substituents represented by $R^9$, $R^{10}$, $R^{11}$, $R^{12}$ and $R^{13}$ include those represented by $A^1$, $A^2$, $B^1$ and $B^2$ cited previously. Preferable examples of the substitutents represented by $R^9$ to $R^{13}$ include a halogen atom, an alkyl group of 1 to 8 carbon atoms, an alkenyl group of 2 to 8 carbon atoms, an alkynyl group of 2 to 8 carbon atoms, an aryl group of 6 to 10 carbon atoms, an aralkyl group of 7 to 10 carbon atoms, an alkoxy group of 1 to 8 carbon atoms, an amido group of 1 to 8 carbon atoms, a ureido group of 1 to 8 carbon atoms, a carbamoyl group of 1 to 8 carbon atoms, an alkylthio group of 1 to 8 carbon atoms, and an unsubstituted amino group or an amino group of 1 to 8 carbon atoms. More preferable substituents represented by $R^9$ to $R^{13}$ include an alkyl group of 1 to 8 carbon atoms (e.g., methyl and ethyl), an alkoxy group of 1 to 8 carbon atoms (e.g., methoxy), a ureido group of 1 to 8 carbon atoms (e.g., ureido and methyl ureido) or an unsubstituted amino group or an amino group of 1 to 8 carbon atoms (e.g., dimethylamino). The substituent represented by $R^{13}$ should more preferably be a halogen atom (e.g., F and Cl), an alkyl group of 1 to 8 carbon atoms (e.g., methyl and ethyl), an alkoxy group of 1 to 8 carbon atoms (e.g., methoxy), an amide group of 1 to 8 carbon atoms (e.g., acetamide), a ureido group of 1 to 8 carbon atoms (e.g., ureido), a carbamoyl group of 1 to 8 carbon atoms (e.g., carbamoyl), and an alkylthio group of 1 to 8 carbon atoms (e.g., methylthio).

q and r represent preferably 0 to 2, and particularly preferably 0. p is preferably 1.

Specific examples of the compounds represented by general formulae (I-1), (I-2), (I-3) and (I-4) are given in Japanese Patent Laid-Open No. 138998/1999. In addition to those, the following compounds can also be used. However, the scope of the invention is not restricted to the compounds at all.

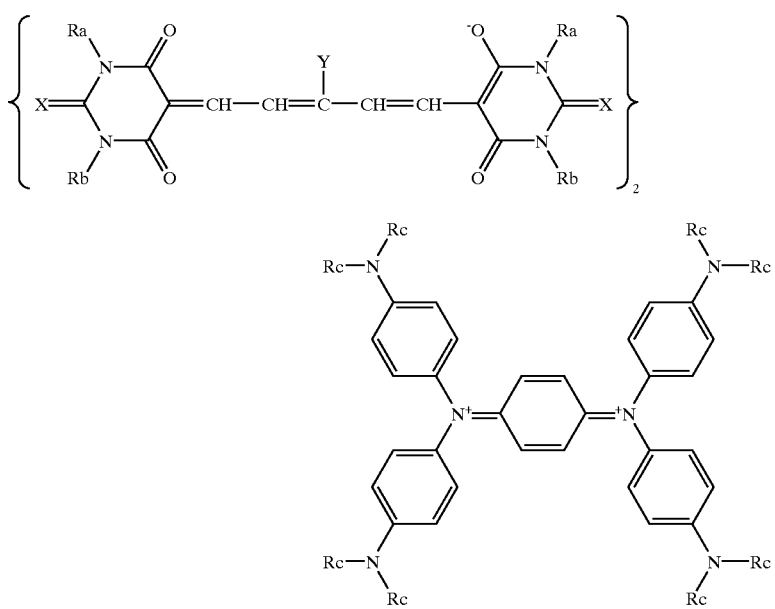

| Compound No. | X | Y | Ra | Rb | Rc |
|---|---|---|---|---|---|
| I-1 | O | H | H | H | $C_4H_9$ |
| I-2 | O | H | $CH_3$ | H | $C_4H_9$ |
| I-3 | O | H | $CH_3$ | H | $(CH_2)_3CN$ |
| I-4 | O | H | $CH_3$ | $CH_3$ | $(CH_2)_3CN$ |
| I-5 | O | H | $CH_3$ | $CH_3$ | $C_4H_9$ |
| I-6 | O | $CH_3$ | $CH_3$ | H | $C_4H_9$ |
| I-7 | O | Ph | $CH_3$ | H | $C_4H_9$ |
| I-8 | O | $CH_3$ | $CH_3$ | $CH_3$ | $C_4H_9$ |
| I-9 | O | Ph | $CH_3$ | $CH_3$ | $C_4H_9$ |
| I-10 | O | H | Ph | H | $(CH_2)_3CN$ |
| I-11 | O | H | $CH_3$ | Ph | $C_4H_9$ |
| I-12 | O | $CH_3$ | $CH_3$ | Ph | $C_4H_9$ |
| I-13 | O | Ph | $CH_3$ | Ph | $C_4H_9$ |
| I-14 | O | H | $CH_3$ | Ph | $(CH_2)_3CN$ |
| I-15 | O | $CH_3$ | H | Ph | $C_4H_9$ |
| I-16 | S | H | H | H | $C_4H_9$ |
| I-17 | S | H | $CH_3$ | $CH_3$ | $(CH_2)_3CN$ |
| I-18 | S | H | $CH_3$ | $CH_3$ | $C_4H_9$ |
| I-19 | S | H | $C_2H_5$ | $C_2H_5$ | $(CH_2)_3CN$ |
| I-20 | S | H | H | $CH_3$ | $C_4H_9$ |

-continued
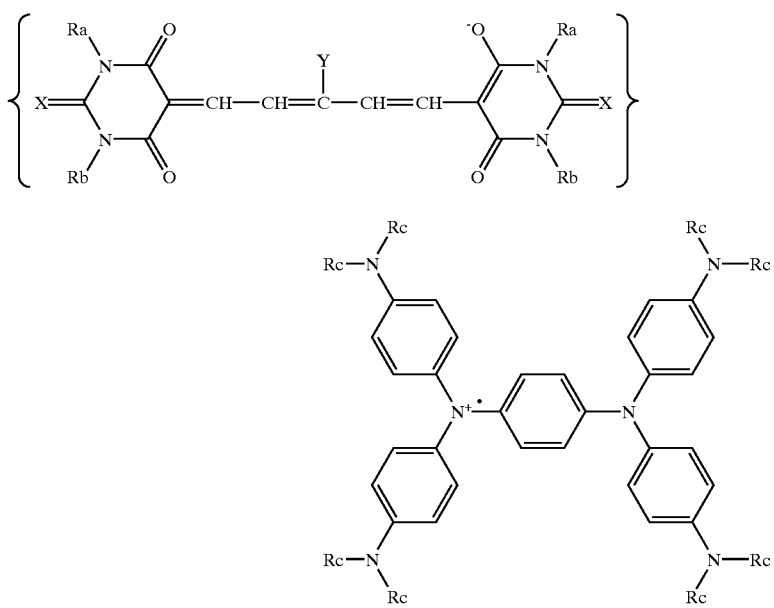
| Compound No. | X | Y | Ra | Rb | Rc |
|---|---|---|---|---|---|
| I-21 | O | H | H | H | C4H9 |
| I-22 | O | H | CH3 | H | C4H9 |
| I-23 | O | H | CH3 | H | (CH2)3CN |
| I-24 | O | H | CH3 | CH3 | (CH2)3CN |
| I-25 | O | H | CH3 | CH3 | C4H9 |
| I-26 | O | CH3 | CH3 | CH3 | C4H9 |
| I-27 | O | Ph | CH3 | CH3 | C4H9 |
| I-28 | O | H | CH3 | Ph | C4H9 |
| I-29 | O | H | CH3 | Ph | (CH2)3CN |
| I-30 | S | H | CH3 | CH3 | (CH2)3CN |
| I-31 | S | H | CH3 | CH3 | C4H9 |
| I-32 | S | H | C2H5 | C2H5 | (CH2)3CN |
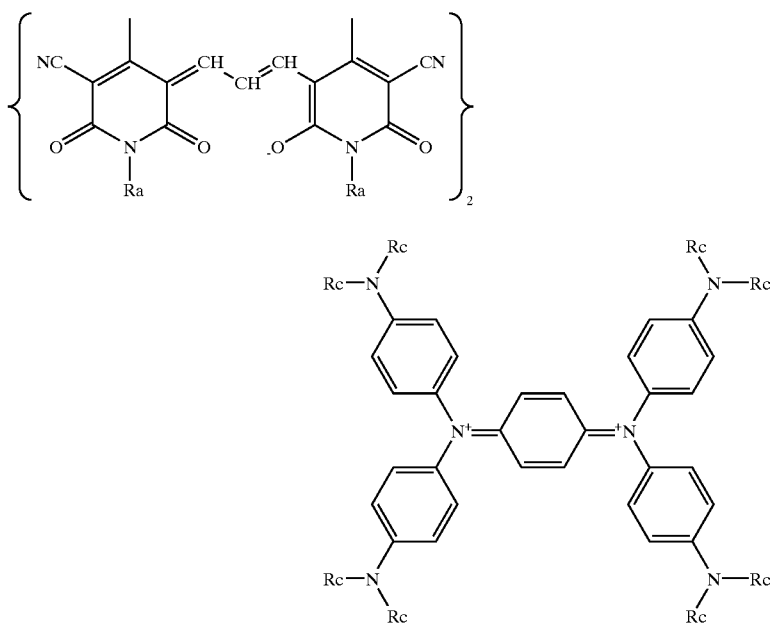
| Compound No. | Ra | Rc |
|---|---|---|
| I-33 | H | C4H9 |
| I-34 | H | (CH2)3CN |

-continued
| | | |
|---|---|---|
| I-35 | CH₃ | C₄H₉ |
| I-36 | CH₃ | (CH₂)₃CN |
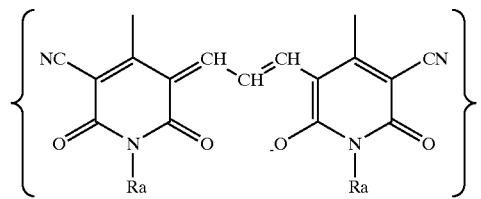
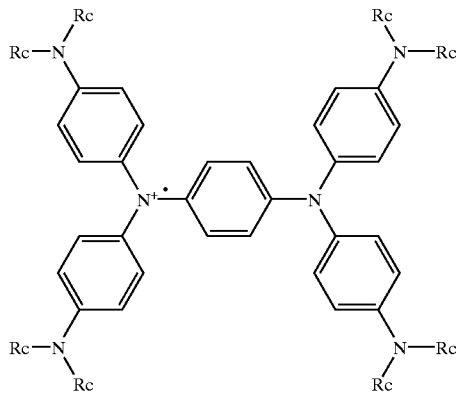
| Compound No. | Ra | Rc |
|---|---|---|
| I-37 | H | C₄H₉ |
| I-38 | H | (CH₂)₃CN |
| I-39 | CH₃ | C₄H₉ |
| I-40 | CH₃ | (CH₂)₃CN |
| I-41 | Ph | (CH₂)₃CN |
| I-42 | Ph | C₄H₉ |
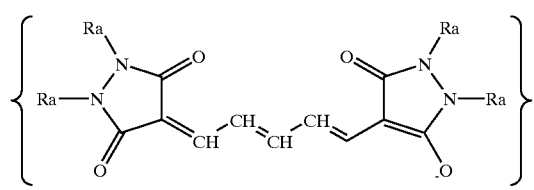
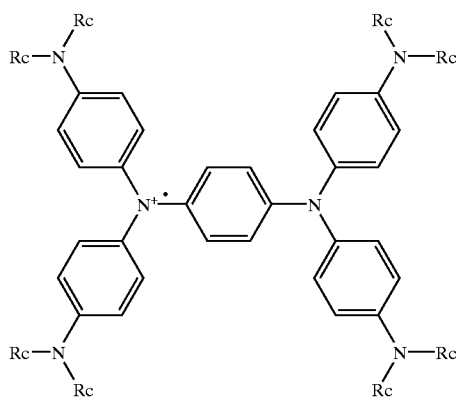
| Compound No. | Ra | Rc |
|---|---|---|
| I-43 | H | C₄H₉ |
| I-44 | H | (CH₂)₃CN |
| I-45 | CH₃ | C₄H₉ |

-continued
| | | |
|---|---|---|
| I-46 | CH₃ | (CH₂)₃CN |
| I-47 | Ph | (CH₂)₃CN |
| I-48 | Ph | C₄H₉ |
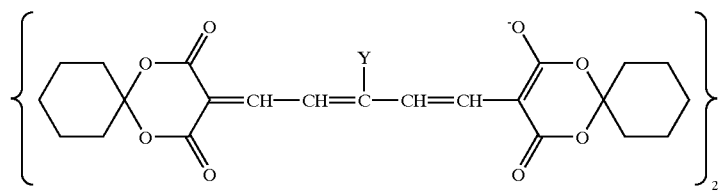
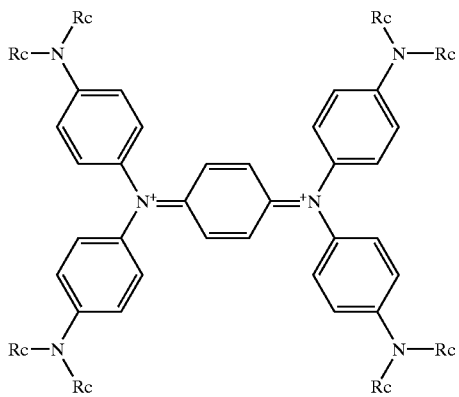
| Compound No. | Y | Rc |
|---|---|---|
| I-49 | H | C₄H₉ |
| I-50 | H | (CH₂)₃CN |
| I-51 | N-methylpyrrolidinone | C₄H₉ |
| I-52 | N-methylpyrrolidinone | (CH₂)₃CN |
| I-53 | Ph | (CH₂)₃CN |
| I-54 | Ph | C₄H₉ |
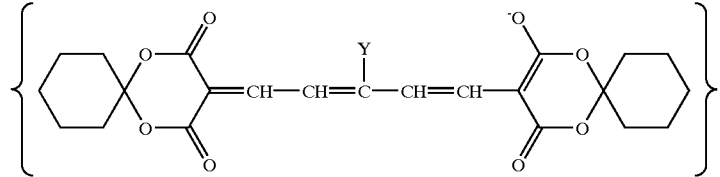

-continued
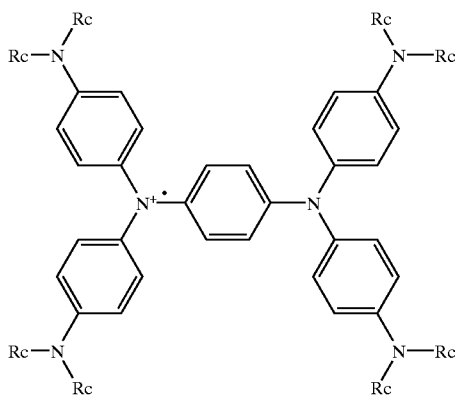
| Compound No. | Y | Rc |
|---|---|---|
| I-55 | H | $(CH_2)_3CN$ |
| I-56 | 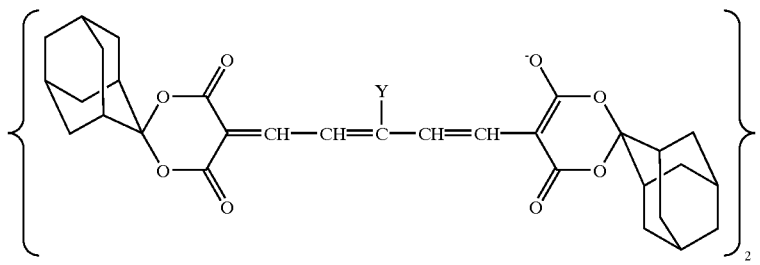 | $C_4H_9$ |
| I-57 |  | $(CH_2)_3CN$ |
| I-58 | Ph | $(CH_2)_3CN$ |
| I-59 | Ph | $C_4H_9$ |
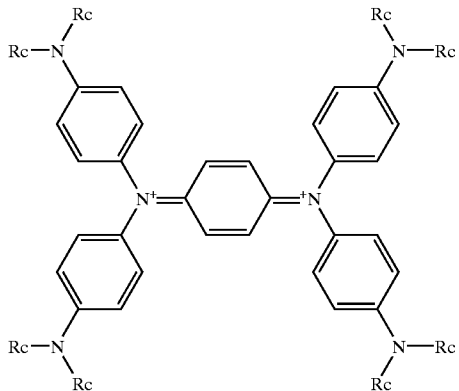
| Compound No. | Y | Rc |
|---|---|---|
| I-60 | H | $C_4H_9$ |

-continued
| | | |
|---|---|---|
| I-61 | 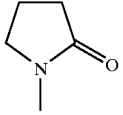 | C_4H_9 |
| I-62 | Ph | C_4H_9 |
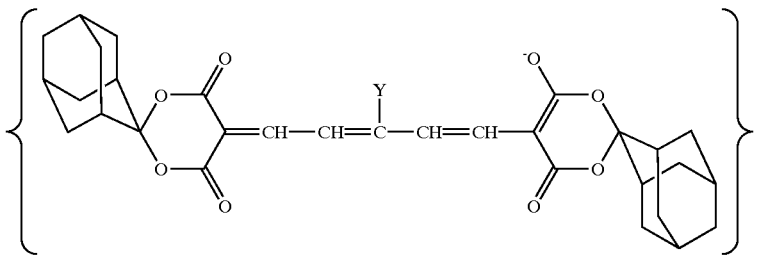
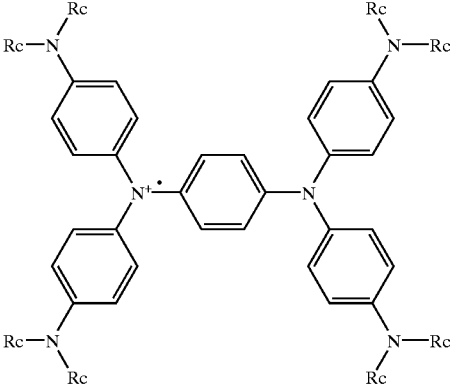
| Compound No. | Y | Rc |
|---|---|---|
| I-63 | H | $(CH_2)_3CN$ |
| I-64 | 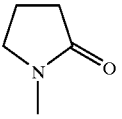 | $(CH_2)_3CN$ |
| I-65 | Ph | $(CH_2)_3CN$ |
I-66
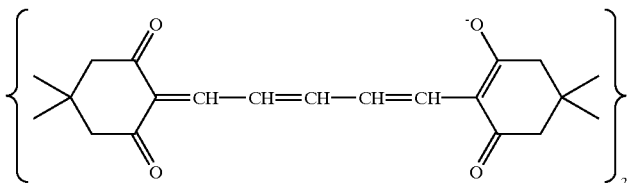

-continued

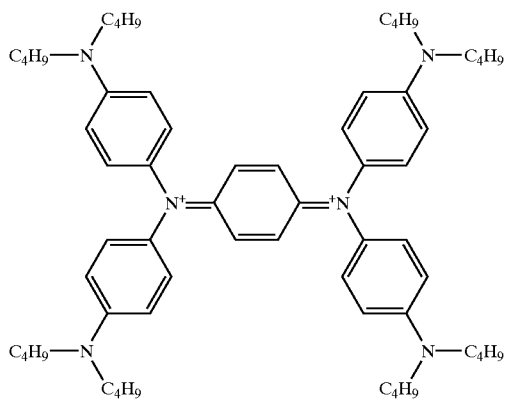

I-67

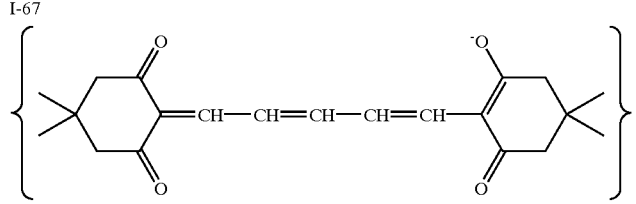

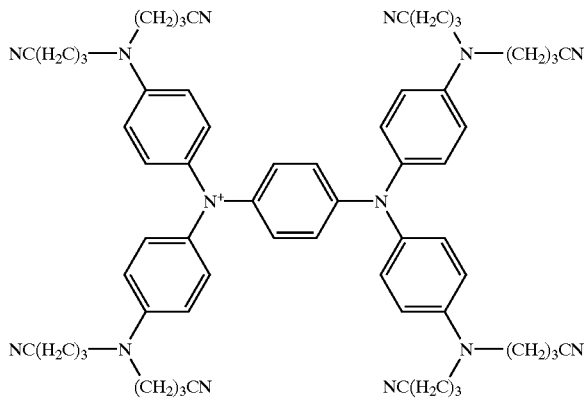

These compounds can be prepared according to the synthetic method described in Japanese Patent Laid-Open No. 138998/1999.

Next, the organic dye other than the compounds of formulae (I-1), (I-2), (I-3) and (I-4) is described below. The organic dye for use herein is preferably a cyanine or oxonol dye, more preferably an oxonol dye. In the invention, the "oxonol dyes" means polymethine dyes having an anionic chromogenic group. Specifically the oxonol dyes given in Japanese Patent Laid-Open Nos. 209995/1988, 297103/1998, 78106/1999 and 348420/1999 are included. From the viewpoint of excellent recording characteristics, those represented by the following general formula (II) are particularly preferred.

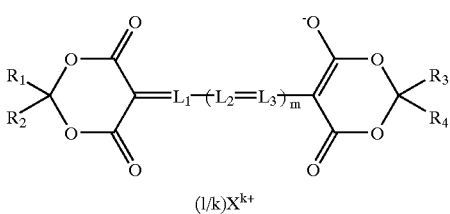

In the above formula, $R_1$, $R_2$, $R_3$ and $R_4$ each independently represents a hydrogen atom, an alkyl group, an aryl group, an aralkyl group or a heterocyclic group; $L_1$, $L_2$ and $L_3$ each independently represents a methine group which may have a substituent; m represents a numeral of 0 to 3; $X^{k+}$ represents a cation; and k represents an integer of 1 to 10.)

The oxonol dyes represented by the above general formula (II) are described.

In the formula $R_1$, $R_2$, $R_3$ and $R_4$ each independently represents a hydrogen atom, an alkyl group, an aryl group, an aralkyl group or a heterocyclic group. The alkyl group includes those of 1 to 20 carbon atoms (e.g., methyl, ethyl, propyl, butyl, i-butyl, t-butyl, i-amyl, cyclopropyl and cyclohexyl) and they may have the following substituent (except the alkyl groups). Examples of the substituent (these examples are hereinafter referred3 to as "SUB") include an alkyl group having 1 to 20 carbon atoms (e.g., methyl, ethyl, propyl, carboxymethyl, ethoxycarbonylmethyl), an aralkyl group having 7 to 20 carbon atoms (e.g., benzyl and phenethyl), an alkoxy group having 1 to 8 carbon atoms (e.g., methoxy and ethoxy), an aryl group having 6 to 20 carbon atoms (e.g., phenyl and naphthyl), an aryloxy group having 6 to 20 carbon atoms (e.g., phenoxy and naphthoxy), a heterocyclic group (e.g., pyridyl, pyrimidyl, pyridazyl, benzimidazolyl, benzothiazolyl, benzoxazolyl, 2-pyrrolidinone-1-yl, 2-piperidone-1-yl, 2,4-dioxyimidazolidine-3-yl, 2,4-dioxyoxazolidine-3-yl, succinimide, phthalimide and maleimide), a halogen atom (exemplifed by F, Cl, Br and I), a carboxyl group, an alkoxycarbonyl group having 2 to 10 carbon atoms (e.g., methoxycarbonyl and ethoxycarbonyl), cyano group, an acyl group having 2 to 10 carbon atoms (e.g., acetyl and pivaloyl), a carbamoyl group having 1 to 10 carbon atoms (e.g., carbamoyl, methylcarbamoyl and morpholinocarbamoyl), amino group, a substituted amino group having 1 to 20 carbon atoms (e.g., dimethylamino, diethylamino, bis(methylsulfonylethyl)amino, N-etyl-N'-sulfoethylamino), sulfo group, hydroxyl group, nitro group, a sulfonamide group having 1 to 10 carbon atoms (e.g., methanesulfonamide), an ureido group having 1 to 10 carbon atoms (e.g., ureido and methylureido), a sulfonyl group having 1 to 10 carbon atoms (e.g., methanesulfonyl and ethanesulfonyl), a sulfinyl group having 1 to 10 carbon atoms (e.g., methanesulfinyl) and a sulfamoyl group having 0 to 10 carbon atoms (e.g., sulfamoyl and methaneslfanoyl). The carboxyl and sulfo groups may be in the form of salt.

The aryl groups represented by $R_1$, $R_2$, $R_3$ and $R_4$ include those of 6 to 20 carbon atoms (e.g., phenyl and naphthyl). Such an aryl group may have a substituent "SUB" defined above. The aralkyl groups represented by $R_1$, $R_2$, $R_3$ and $R_4$ include those of 7 to 20 carbon atoms (e.g., benzyl and phenethyl). Such an aralkyl group may have a substituent "SUB" defined above. The heterocyclic groups represented by $R_1$, $R_2$, $R_3$ and $R_4$ include 5- to 6-membered, saturated or unsaturated ones containing carbon, nitrogen, oxygen or sulfur, e.g., pyridyl, pyrimidyl, pyridazyl, piperidyl, triazyl, pyrrolyl, imidazolyl, triazolyl, furanyl, thiophenyl, thiazolyl, oxazolyl, isothiazolyl and isoxazolyl; such a heterocyclic group may be condensed with a benzene ring (e.g., quinolyl, benzimidazolyl, benzothiazolyl and benzoxazolyl), and may have, for example, a substituent "SUB" defined above on the heterocycle.

Preferable examples for $R_1$, $R_2$, $R_3$ and $R_4$ are alkyl groups of 1 to 8 carbon atoms, aryl groups of 6 to 10 carbon atoms, aralkyl groups of 7 to 10 carbon atoms, or heterocyclic groups of 6 to 10 carbon atoms. When both of $R_1$ and $R_2$, or both of $R_3$ and $R_4$ are alkyl groups, each pair can combine with each other to form a carbocyclic group such as cyclopropyl, cyclobutyl, cyclopentyl, cyclohexyl, 2-methylcyclohexyl, cycloheptyl or cyclooctyl, or a heterocyclic group such as piperidyl, chromanyl or morpholyl. A carbocyclic ring of 3 to 10 carbon atoms or a heterocyclic ring of 2 to 10 carbon atoms are preferred. In the case where $R_1$ and $R_2$ and/or $R_3$ and $R_4$ combine to form a ring structure, excellent storage resistance against moisture and heat can be achieved.

$L_1$, $L_2$ and $L_3$ each independently represents a substituted or unsubstituted methine group, and preferable substituents include the substituents "SUB" defined above. Preferable examples for $L_1$, $L_2$ and $L_3$ include unsubstituted methine groups, alkyl-substituted methine groups of 1 to 5 carbon atoms, aralkyl-substituted methine groups of 7 to 10 carbon atoms, aryl-substituted methine groups of 6 to 10 carbon atoms, methine groups substituted by saturated or unsaturated heterocyclic groups, and halogen-substituted methine groups. m represents an integer of 0 to 3, preferably 1 to 3. When m is 2 or more, the plural $L_2$'s and $L_3$'s may be the same or different.

Now, the cationic part is described in detail. The cation represented by $X^{k+}$ include, for example, hydrogen ion, a metallic ion such as sodium ion, potassium ion, lithium ion, calcium ion, iron ion and cupper ion, a metal complex ion, ammonium ion, pyridinium ion, oxonium ion, sulfonium ion, phosphonium ion, selenonium ion and iodonium ion. It is preferred that $X^{k+}$ is not a cyanine dye. $X^{k+}$ is preferably a quaternary ammonium ion.

The quaternary ammonium ion represented by $X^{k+}$ preferably one comprises a nitrogen-containing heterocyclic group. Among such ammonium ions, a particularly preferable one is quaternary pyridinium ion.

Symbol k represents an integer of 1 to 10, 1 to 4 being preferred. Particularly preferably k is 2.

It is particularly preferred that $X^{k+}$ is an onium ion represented by the following general formula (II-1).

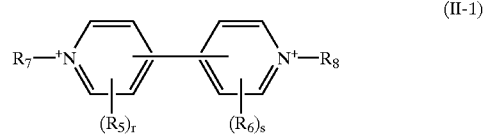
(II-1)

In the above formula, $R_5$ and $R_6$ each independently represents a substitutent, and $R_7$ and $R_8$ each independently represents an alkyl group, an alkenyl group, an alkynyl group, an aralkyl group, an aryl group or a heterocyclic group. Each pair of $R_5$ and $R_6$, $R_5$ and $R_7$, $R_6$ and $R_8$, or $R_7$ and $R_8$ may connect together to form a ring, r and s each represents an integer of 0 to 4, and when r and s are not less than 2, the plural $R_5$'s and $R_6$'s may be the same or different.

As the alkyl group represented by $R_7$ and $R_8$, substituted or unsubstituted alkyl groups of 1 to 18 carbon atoms are preferred, more preferable ones being substituted or unsubstituted alkyl groups of 1 to 8 carbon atoms. Their structures may be straight-chained, branched or cyclic. Specific examples include methyl, ethyl, n-propyl, isopropyl, n-butyl, isobutyl, t-butyl, n-hexyl, neopentyl, cyclohexyl, adamantyl and cyclopropyl.

The substituent for the alkyl group includes the following. A substituted or unsubstituted alkenyl group of 2 to 18 (preferably 2 to 8) carbon atoms (e.g., vinyl); a substituted or unsubstituted alkynyl group of 2 to 18 (preferably 2 to 8) carbon atoms (e.g., ethynyl); a substituted or unsubstituted aryl group of 6 to 10 carbon atoms (e.g., phenyl and naphthyl); a halogen atom (e.g., F, Cl and Br); a substituted or unsubstituted alkoxy group having 1 to 18 (preferably 1 to 8) carbon atoms (e.g., methoxy and ethoxy); a substituted or unsubstituted aryloxy group having 6 to 10 carbon atoms (e.g., phenoxy and p-methoxyphenoxy); a substituted or unsubstituted alkylthio group having 1 to 18 (preferably 1 to 8) carbon atoms (e.g., methylthio and ethylthio); a substituted or unsubstituted arylthio group having 6 to 10 carbon atoms (e.g., phenylthio); and a substituted or unsubstituted acyl group having 2 to 18 (preferably 2 to 8) carbon atoms (e.g., acetyl and propionyl); a substituted or unsubstituted alkylsulfonyl or arylsulfonyl group having 1 to 18 (preferably 1 to 8) carbon atoms (e.g., methylsulfonyl and p-toluenesulfonyl); a substituted or unsubstituted acyloxy group having 2 to 18 (preferably 2 to 8) carbon atoms (e.g., acetoxy and propionyloxy); a substituted or unsubstituted alkoxycarbonyl group having 2 to 18 (preferably 2 to 8) carbon atoms (e.g., methoxycarbonyl and ethoxycarbonyl); a substituted or unsubstituted aryloxycarbonyl group having 7 to 11 carbon atoms (e.g., naphthoxycarbonyl); unsubstituted amino group or a substituted amino group having 1 to 18 (preferably 1 to 8) carbon atoms (e.g., methylamino, dimethylamino, diethylamino, anilino, methoxyphenylamino, chlorophenylamino, pyridylamino, methoxycarbonylamino, n-butoxycarbonylamino, phenoxycarbonylamino, methylcarbamoylamino, phenoxycarbonylamino, methylcarbamoylamino, ethylthiocarbamoylamino, phenylcarbamoylamino, acetylamino, ethylcarbonylamino, ethylthiocarbonylamino, cyclohexylcarbonylamino, benzoylamino, chloroacetylamino, and methylsulfonylamino); a substituted or unsubstituted carbamoyl group having 1 to 18 (preferably 1 to 8) carbon atoms (e.g., carbamoyl, methylcarbamoyl, ethylcarbamoyl, n-butylcarbamoyl, t-butylcarbamoyl, dimethylcarbamoyl, morpholinocarbamoyl and pyridinocarbamoyl); unsubstituted sulfamoyl group or a substituted sulfamoyl group having 1 to 18 (preferably 1 to 18) carbon atoms (e.g., methylsulfamoyl and phenylsulfamoyl); cyano group; nitro group; carboxyl group; hydroxyl group; and a heterocyclic group (e.g., oxazole, benzoxazole, thiazole, benzothiazole, imidazole, benzimidazole, indolenine, pyridine, piperidine, pyrrolidine, morpholine, sulfolane, furan, thiophene, pyrazole, pyrrole, chroman and coumarine).

The alkenyl group represented by $R_7$ and $R_8$ is preferably a substituted or unsubstituted one with 2 to 18, more preferably 2 to 8, carbon atoms. Specific examples thereof include vinyl, allyl, 1-propenyl and 1,3-butadienyl. Preferable substituents for these alkenyl groups are common to those for the alkyl groups cited above.

The alkynyl group represented by $R_7$ and $R_8$ is preferably a substituted or unsubstituted one with 2 to 18, more preferably 2 to 8, carbon atoms. Specific examples thereof include ethynyl and 2-propynyl. Preferable substituents for these alkynyl groups are common to those for the alkyl groups cited above.

The aralkyl group represented by $R_7$ and $R_8$ is preferably a substituted or unsubstituted one with 7 to 18 carbon atoms. Specific examples thereof include benzyl and methylbenzyl. Preferable substituents for these aralkyl groups are common to those for the alkyl groups cited above.

The aryl group represented by $R_7$ and $R_8$ is preferably a substituted or unsubstituted one with 6 to 18 carbon atoms. Specific examples thereof include phenyl and naphthyl. Preferable substituents for these aralkyl groups are common to those for the alkyl groups cited above. In addition to those, alkyl groups such as, for example, methyl and ethyl are preferred, too.

The heterocyclic group represented by $R_7$ and $R_8$ is a 5- or 6-membered substituted or unsubstituted one comprising carbon, nitrogen, oxygen or sulfur atom. Examples thereof include oxazole, benzoxazole, thiazole, benzothiazole, imidazole, benzimidazole, indolenine, pyridine, piperidine, pyrrolidine, morpholine, sulfolane, furan, thiophene, pyrazole, pyrrole, chroman and coumarine. These heterocyclic rings may have a substituent including those enumerated as the substituent for the alkyl group mentioned hereinabove.

The substituents represented by $R_5$ and $R_6$ are common to those enumerated as the substituents for the alkyl group mentioned hereinabove. In the invention, each substituent represented by $R_5$ or $R_6$ is preferably a hydrogen atom or an alkyl group, the former being particularly preferred.

In general formula (II), the cationic part represented by general formula (II-1) is particularly preferably represented by general formulae (II-2) or (II-3).

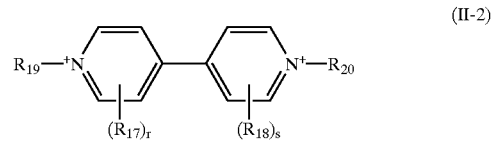

(II-2)

In the above formula, $R_{17}$ and $R_{18}$ each represents the same substituents as those represented by $R_5$ and $R_6$, and their preferred ranges are also the same. $R_{19}$ and $R_{20}$ each represents the same substituents as those represented by $R_7$ and $R_8$, and their preferred ranges are also the same. r and s each independently represents an integer of 0 to 4, and when r and s are not less than 2, the plural $R_{17}$'s and $R_{18}$'s may be the same or different.

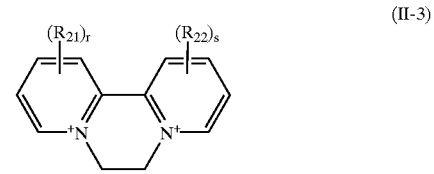

(II-3)

In the above formula, $R_{21}$ and $R_{22}$ each represents the same substituents as those represented by $R_5$ and $R_6$, and their preferred ranges are also the same. The case where each of $R_{21}$'s and $R_{22}$'s combine with each other to form a carbo- or hetero-cyclic ring is also preferred. Particularly preferred is the case where a condensed aromatic ring is formed in conjunction with the pyridine ring to which $R_{21}$'s or $R_{22}$'s are attached. r and s each independently represents an integer of 0 to 4, and when r and s are not less than 2, the plural $R_{21}$'s and $R_{22}$'s may be the same or different.

Specific examples of the oxonol dyes represented by general formula (II) are given in Japanese Patent Laid-Open No. 2000-52658. In addition to those, the following compounds can also be used. However, the scope of the invention is not restricted to the compounds at all.

| Compound No. | Y | Ra | Rb | Rc |
|---|---|---|---|---|
| II-1 | H | H | H | —CH(CH$_3$)$_2$ |
| II-2 | Ph | H | H | —CH(CH$_3$)$_2$ |
| II-3 | CH$_3$ | H | H | —CH(CH$_3$)$_2$ |
| II-4 | N-methylpyrrolidinone | H | H | —CH(CH$_3$)$_2$ |
| II-5 | H | Ph | H | H |
| II-6 | Ph | Ph | H | H |
| II-7 | H | H | H | —NHCOCH(CH$_3$)$_2$ |
| II-8 | CH$_3$ | H | H | —NHCOCH(CH$_3$)$_2$ |
| II-9 | Ph | H | H | —NHCOCH(CH$_3$)$_2$ |
| II-10 | N-methylpyrrolidinone | H | H | —NHCOCH(CH$_3$)$_2$ |
| II-11 | H | H | H | —NHCOC$_5$H$_{11}$ |
| II-12 | CH$_3$ | H | H | —NHCOC$_5$H$_{11}$ |
| II-13 | Ph | H | H | —NHCOC$_5$H$_{11}$ |
| II-14 | H | H | —C(=O)Ph | H |
| II-15 | Ph | H | —C(=O)Ph | H |
| II-16 | CH$_3$ | H | —C(=O)Ph | H |
| II-17 | N-methylpyrrolidinone | H | —C(=O)Ph | H |
| II-18 | H | H | —OPh | H |
| II-19 | Ph | H | —OPh | H |
| II-20 | CH$_3$ | H | —OPh | H |
| II-21 | N-methylpyrrolidinone | H | —OPh | H |

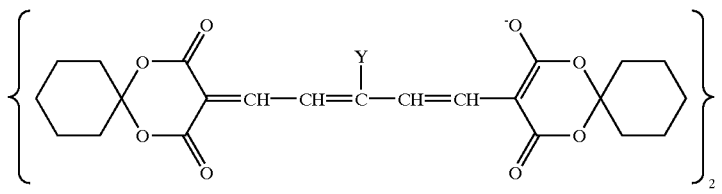

-continued
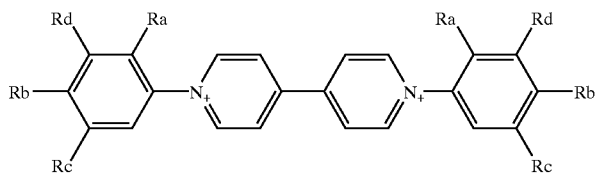
| Compound No. | Y | Ra | Rb | Rc | Rd |
|---|---|---|---|---|---|
| II-22 | H | H | H | Cl | Cl |
| II-23 | Ph | H | H | Cl | Cl |
| II-24 | CH$_3$ | H | H | Cl | Cl |
| II-25 | N-methylpyrrolidinone | H | H | Cl | Cl |
| II-26 | H | H | OH | Cl | Cl |
| II-27 | Ph | H | OH | Cl | Cl |
| II-28 | CH$_3$ | H | OH | Cl | Cl |
| II-29 | H | H | OH | Ph | H |
| II-30 | Ph | H | OH | Ph | H |
| II-31 | CH$_3$ | H | OH | Ph | H |
| II-32 | N-methylpyrrolidinone | H | OH | Ph | H |
| II-33 | H | OH | H | Ph | H |
| II-34 | Ph | OH | H | Ph | H |
| II-35 | CH$_3$ | OH | H | Ph | H |
| II-36 | N-methylpyrrolidinone | OH | H | Ph | H |
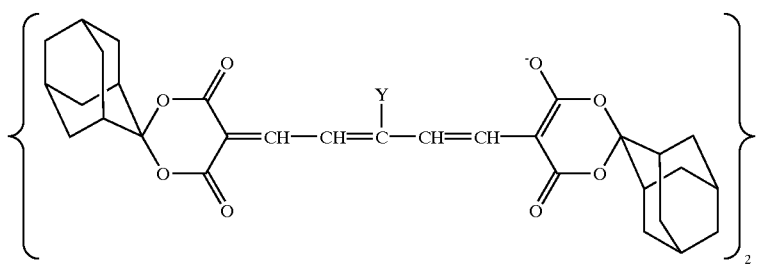
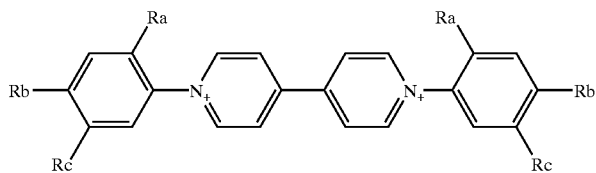
| Compound No. | Y | Ra | Rb | Rc |
|---|---|---|---|---|
| II-37 | H | H | H | —CH(CH$_3$)$_2$ |
| II-38 | Ph | H | H | —CH(CH$_3$)$_2$ |
| II-39 | CH$_3$ | H | H | —CH(CH$_3$)$_2$ |

-continued

| Compound No. | | | | |
|---|---|---|---|---|
| II-40 | 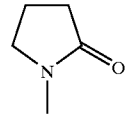 | H | H | —CH(CH$_3$)$_2$ |
| II-41 | H | Ph | H | H |
| II-42 | Ph | Ph | H | H |
| II-43 | H | H | H | —NHCOCH(CH$_3$)$_2$ |
| II-44 | CH$_3$ | H | H | —NHCOCH(CH$_3$)$_2$ |
| II-45 | Ph | H | H | —NHCOCH(CH$_3$)$_2$ |
| II-46 | 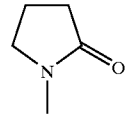 | H | H | —NHCOCH(CH$_3$)$_2$ |
| II-47 | H | H | H | —NHCOC$_5$H$_{11}$ |
| II-48 | CH$_3$ | H | H | —NHCOC$_5$H$_{11}$ |
| II-49 | Ph | H | H | —NHCOC$_5$H$_{11}$ |
| II-50 | H | H | —C(=O)Ph | H |
| II-51 | Ph | H | —C(=O)Ph | H |
| II-52 | CH$_3$ | H | —C(=O)Ph | H |
| II-53 | 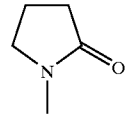 | H | —C(=O)Ph | H |
| II-54 | H | H | —OPh | H |
| II-55 | Ph | H | —OPh | H |
| II-56 | CH$_3$ | H | —OPh | H |
| II-57 | 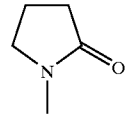 | H | —OPh | H |

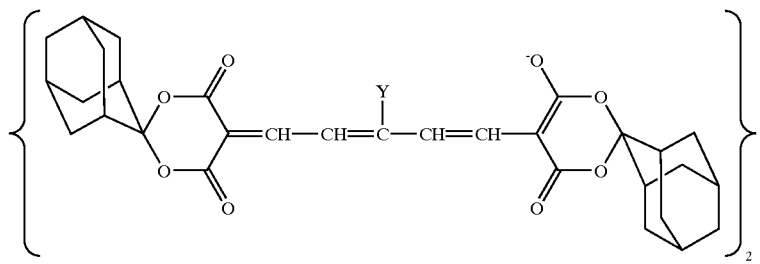

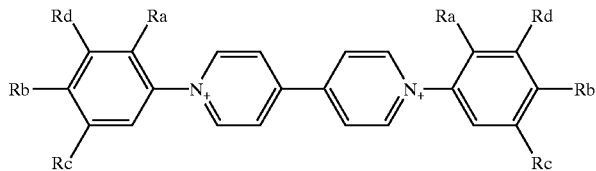

| Compound No. | Y | Ra | Rb | Rc | Rd |
|---|---|---|---|---|---|
| II-58 | H | H | H | Cl | Cl |
| II-59 | Ph | H | H | Cl | Cl |
| II-60 | CH$_3$ | H | H | Cl | Cl |
| II-61 |  | H | H | Cl | Cl |

-continued

| | | | | | |
|---|---|---|---|---|---|
| II-62 | H | H | OH | Cl | Cl |
| II-63 | Ph | H | OH | Cl | Cl |
| II-64 | CH₃ | H | OH | Cl | Cl |
| II-65 | H | H | OH | Ph | H |
| II-66 | Ph | H | OH | Ph | H |
| II-67 | CH₃ | H | OH | Ph | H |
| II-68 | (1-methyl-2-oxopyrrolidin-3-yl) | H | OH | Ph | H |
| II-69 | H | OH | H | Ph | H |
| II-70 | Ph | OH | H | Ph | H |
| II-71 | CH₃ | OH | H | Ph | H |
| II-72 | (1-methyl-2-oxopyrrolidin-3-yl) | OH | H | Ph | H |

$$\left\{ \text{Ph} \underset{O}{\overset{O}{\bigcirc}} \text{=CH—CH=}\overset{Y}{\text{C}}\text{—CH=CH—} \underset{O}{\overset{O^-}{\bigcirc}} \text{Ph} \right\}_2$$

[Structure: bipyridinium with Rd, Ra, Rb, Rc substituents on phenyl rings attached to N⁺ of each pyridine]

| Compound No. | Y | Ra | Rb | Rc | Rd |
|---|---|---|---|---|---|
| II-73 | H | H | H | Cl | Cl |
| II-74 | Ph | H | H | Cl | Cl |
| II-75 | CH₃ | H | H | Cl | Cl |
| II-76 | (1-methyl-2-oxopyrrolidin-3-yl) | H | H | Cl | Cl |
| II-77 | H | H | OH | Cl | Cl |
| II-78 | Ph | H | OH | Cl | Cl |
| II-79 | CH₃ | H | OH | Cl | Cl |
| II-80 | H | H | Ph | OH | H |
| II-81 | Ph | H | Ph | OH | H |
| II-82 | CH₃ | H | Ph | OH | H |
| II-83 | (1-methyl-2-oxopyrrolidin-3-yl) | H | Ph | OH | H |
| II-84 | H | OH | H | Ph | H |
| II-85 | Ph | OH | H | Ph | H |
| II-86 | CH₃ | OH | H | Ph | H |
| II-87 | (1-methyl-2-oxopyrrolidin-3-yl) | OH | H | Ph | H |

-continued
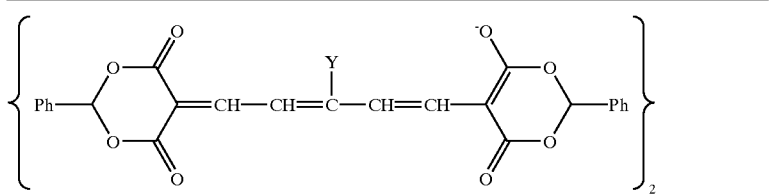
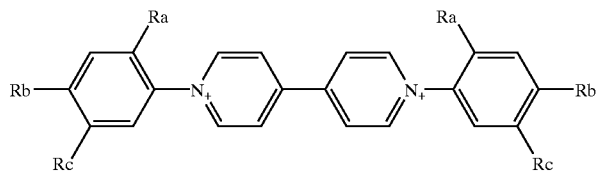
| Compound No. | Y | Ra | Rb | Rc |
|---|---|---|---|---|
| II-88 | H | H | H | —CH(CH₃)₂ |
| II-89 | Ph | H | H | —CH(CH₃)₂ |
| II-90 | CH₃ | H | H | —CH(CH₃)₂ |
| II-91 | 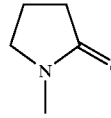 | H | H | —CH(CH₃)₂ |
| II-92 | H | Ph | H | H |
| II-93 | Ph | Ph | H | H |
| II-94 | H | H | H | —NHCOCH(CH₃)₂ |
| II-95 | CH₃ | H | H | —NHCOCH(CH₃)₂ |
| II-96 | Ph | H | H | —NHCOCH(CH₃)₂ |
| II-97 | 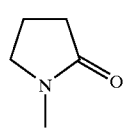 | H | H | —NHCOCH(CH₃)₂ |
| II-98 | H | H | H | —NHCOC₅H₁₁ |
| II-99 | CH₃ | H | H | —NHCOC₅H₁₁ |
| II-100 | Ph | H | H | —NHCOC₅H₁₁ |
| II-101 | H | H | —C(=O)Ph | H |
| II-102 | Ph | H | —C(=O)Ph | H |
| II-103 | CH₃ | H | —C(=O)Ph | H |
| II-104 | 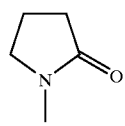 | H | —C(=O)Ph | H |
| II-105 | H | H | —OPh | H |
| II-106 | Ph | H | —OPh | H |
| II-107 | CH₃ | H | —OPh | H |
| II-108 | 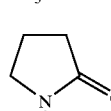 | H | —OPh | H |
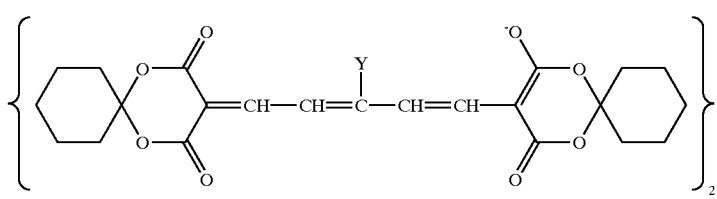

-continued

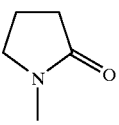

| Compound No. | Y |
|---|---|
| II-109 | H |
| II-110 | Ph |
| II-111 | CH$_3$ |
| II-112 | (pyrrolidinone group) |

These compounds can be prepared according to the synthetic method described in Japanese Patent Laid-Open No. 2000-52658.

The optical information-recording medium of the invention comprises a recording layer provided on a substrate, the recording layer containing an organic dye and further at least one compound represented by general formulae (I-1), (I-2), (I-3) or (I-4). The compounds associated with the invention can be advantageously used in a CD-R or DVD-R type optical information-recording medium.

The recording layer can further contain a variety of dye-fading preventing agents for the purpose of enhancing the light-fastness of the recording layer. As such dye-fading preventing agents, organic oxidants and singlet oxygen quenchers are included. The compounds disclosed in Japanese Patent Laid-Open No. 151861/1998 can be preferably used as the organic oxidant for dye-fading prevention.

The compounds associated with the invention can be used singly or in combination of two or more thereof.

The structure of the optical information-recording medium of the invention is described. As has been described above, the optical information-recording medium of the present invention is not particularly limited so long as it comprises a substrate having thereon a recording layer containing at least one compound represented by general formulae (I-1), (I-2), (I-3) or (I-4) and an organic dye other than the compounds of these formulae. In the case where the medium of the invention is applied to CD-R, a preferable structure thereof comprises a transparent disk substrate of a thickness of 1.2±0.2 mm on which pre-grooves with a 1.4 to 1.8 μm track pitch are formed, and provided thereon in the following order, a recording layer containing at least one compound represented by general formulae (I-1), (I-2), (I-3) or (I-4) and the organic dye, a light reflection layer and a protective layer. In the case where the optical information-recording medium of the invention is applied to DVD-R, the following embodiments are preferred.

(1) An information-recording medium of 1.2±0.2 mm thickness comprising two unit disks of layered structure bonded together with the both recording layer inside relative to the respective substrate, each unit disk comprising a transparent disk substrate of 120±3 mm or 80±3 mm diameter and 0.6±0.1 mm thickness having pre-grooves with 0.6 to 0.9 μm track pitch, and a recording layer that is provided on the surface having the pre-grooves of the substrate and contains the organic dye and at least one compound represented by general formulae (I-1), (I-2), (I-3) or (I-4).

(2) An information-recording medium of 1.2±0.2 mm thickness comprising a layered disk bonded to a protective disk having substantially the same dimensions as those of the layered disk so as to arrange the recording layer of the layered disk inside relative to the substrate, the layered disk comprising a transparent disk substrate of 120±3 mm or 80±3 mm diameter and 0.6±0.1 mm thickness having pre-grooves with 0.6 to 0.9 μm track pitch, and a recording layer that is provided on the surface having the pre-grooves of the substrate and contains the organic dye and at least one compound represented by general formulae (I-1), (I-2), (I-3) or (I-4).

In either embodiment, it is preferred to provide a reflection layer on the recording layer. On the reflection layer a protective layer may be provided.

The manufacturing process of the information-recording medium of the invention is explained below. In the case of applying the information-recording medium of the invention to DVD-R, one can manufacture the medium by using basically the same materials as used for the manufacture of CD-R type information-recording media except that the substrate is altered to the one having pre-grooves with a narrower track pitch than that for CD-R to achieve a higher recording density. The information-recording medium of DVD-R type can be manufactured by first preparing two layered disks in which a recording layer, a reflection layer, and a protective layer if required, are provided on a substrate in this order, and then bonding the two disks together by means of adhesive with the recording layer inside relative to the respective substrate, or by alternatively bonding the layered disk prepared above to a protective disk having substantially the same dimensions as those of the layered disk in a similar manner.

The optical information-recording medium of the invention can be manufactured, for example, by the method to be described hereinafter. The substrate (including the one for the protective disk) can be made of any material that has been used for the substrate of the conventional information-recording media. Specific examples of the substrate material include, for example, glass; polycarbonate resins; acrylic resins such as poly(methyl methacrylate); vinyl chloride-based resins such as poly(vinyl chloride) and vinyl chloride copolymers; epoxy resins; amorphous polyolefin resins; and polyester resins. These materials may be jointly used if required and necessary. These materials can be used in the form of a flexible film or a rigid plate. Among the enumerated materials, polycarbonate resins are preferred from the viewpoints of moisture resistance, dimensional stability and cost.

The substrate surface on which the recording layer is provided may be coated with a subbing layer for the purposes of flatness improvement, adhesion enhancement and the deterioration prevention for the recording layer. Materials for such subbing layer include, for example, polymeric materials such as poly(methyl methacrylate), acrylic acid-methacrylic acid copolymer, styrene-maleic anhydride copolymer, poly(vinyl alcohol), N-methylolacrylamide, styrene-vinyltoluene copolymer, chlorosulfonated polyethylene, nitrocellulose, poly(vinyl chloride), chlorinated polyolefin, polyester, polyimide, vinyl acetate-vinyl chloride copolymer, ethylene-vinyl acetate copolymer, polyethylene, polypropylene and polycarbonate; and surface modifiers such as silane coupling agent. A subbing layer can be formed by dissolving or dispersing the above-cited material in a proper solvent to prepare a coating mixture, which is coated on the substrate surface by a coating method such as spin coating, dip coating or extrusion coating. The thickness of the subbing layer is usually in the range of from 0.005 to 20 $\mu$m, preferably from 0.01 to 10 $\mu$m.

On the substrate surface (or the subbing layer), tracking grooves or pre-grooves representing the information such as address signal are formed. The pre-grooves are preferably formed directly on the substrate so as to have the above-mentioned track pitch during the injection or extrusion molding of the resinous material such as polycarbonate. Alternatively, the pre-grooves may be formed by providing a pre-groove layer. As the materials for the pre-groove layer, a mixture comprising at least a monomer (or an oligomer) selected from the mono-, di-, tri- or tetra-ester of acrylic acid and a photopolymerization initiator. The pre-groove layer can be formed by, for example, first coating a coating liquid comprising an acrylic acid ester and a polymerization initiator on a stamper of high preciseness, placing a substrate on the liquid layer, thereafter irradiating UV light through the substrate or the stamper to cause the polymerization of the coated layer whereby the substrate is bonded to the coated layer, and finally separating off the substrate from the stamper. The thickness of the pre-groove layer is usually in the range of 0.05 to 100 $\mu$m, preferably in 0.1 to 50 $\mu$m.

The depth of the pre-grooves preferably lies in the range of 300 to 2000 Å with the half width thereof being preferably 0.2 to 0.9 $\mu$m. By adjusting the depth of the pre-groove to the range of 1500 to 2000 Å, one can achieve an enhanced sensitivity substantially without sacrificing reflectance. This technique is preferable especially for CD-R.

On the surface of the substrate (or the subbing layer) having formed the pre-grooves, is formed a recording layer comprising the dye compound represented by the aforementioned formulae according to the invention.

The recording layer can be formed by dissolving a dye associated with the invention, a quencher if required and necessary, and a binder in a solvent to prepare a coating mixture, which is coated on a substrate and then dried. Suitable solvents used for the coating mixture forming a dye-based recording layer include esters such as methyl lactate, ethyl lactate, butyl acetate and cellosolve acetate; ketones such as methyl ethyl ketone, cyclohexanone and methyl isobutyl ketone; chlorinated hydrocarbons such as dichloromethane, 1,2-dichloroethane and chloroform; amides such as dimethylformamide; hydrocarbons such as cycylohexane; ethers such as tetrahydrofuran, ethyl ether and dioxane; alcohols such as ethanol, n-propanol, isopropanol, n-butanol and diacetonealcohol; fluorine-containing solvents such as 2,2,3,3-tetrafluoropropanol; and glycol ethers such as ethylene glycol monomethyl ether, ethylene glycol monoethyl ether and propylene glycol monomethyl ether. By taking into account the solubility of the compound used, these solvents may be individually or in combination of two or more thereof. The coating mixture may further be incorporated with various additives including antioxidant, UV absorber, plasticizer and lubricant to appropriately cope with the purpose of the final product.

Examples of the binder include, for example, organic high molecular weight materials of natural origin such as gelatin, cellulose derivatives, dextran, rosin and rubbers; and synthetic organic polymers including hydrocarbon polymers such as polyethylene, polypropylene, polystyrene, polyisobutylene; vinyl polymers such as poly(vinyl chloride), poly(vinylidene chloride), vinyl chloride-vinyl acetate copolymer; acrylic resins such as poly(methyl acrylate) and poly(methyl methacrylate); poly(vinyl alcohol), chlorinated polyethylene, epoxy resin, butyral resin, rubber derivative, and the initial polycondensate of thermally cross-linkable resins such as phenol-formaldehyde resin. In cases where a binder is used in the recording layer, the use amount thereof is in the range of 0.01 to 50, and preferably 0.1 to 5 parts by weight per one part by weight of the organic dyes in the recording layer including those of formulae (I-1) through (I-4). The coating mixture thus prepared usually has a solid content of 0.01 to 10% by weight, preferably 0.1 to 5% by weight.

The coating method of the recording layer includes spray coating, spin coating, dip coating, roll coating, blade coating, doctor roll coating and screen printing. The recording layer may comprise a monolayer or multiple layers. The thickness of the recording layer usually lies in the range of 20 to 500 nm, preferably 50 to 300 nm.

A light reflection layer is provided on the recording layer for the purpose of enhancing the reflectance at the information read-out step. For the reflection layer are used light reflective materials which show a high reflectance for the laser light used for recording and read-out, including various metals and semi-metals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn and Bi and stainless steel. Among them, preferable ones are Cr, Ni, Pt, Cu, Ag, Au, Al and stainless steel. These materials may be used singly or in combination of two or more thereof. They may be used in the form of alloy. The reflection layer can be formed by vapor depositing, sputtering or ion-plating these materials on the recording layer. The thickness of the reflection layer usually lies in the range of 10 to 300 nm, preferably 50 to 200 nm.

On the recording layer, a protective layer may be provided for the purpose of protecting the recording layer physically as well as chemically. Another protective layer may further be provided on the other side of the substrate for the purpose of enhancing abrasion resistance and moisture resistance. The material used for such protective layers includes, for example, inorganic ones such as SiO, $SiO_2$, $MgF_2$, $SnO_2$ and $Si_3N_4$, and organic ones such as thermoplastic resins, thermo-curable resins and UV curable resins. The protective layer can be formed by laminating a film obtained by the extrusion processing of a plastic material with use of an adhesive on the reflection layer and/or the substrate. The protective layer may be formed by vacuum deposition, sputtering or coating. In cases where the material is a thermoplastic or thermo-curable resin, the resin solution prepared by dissolving the resin in a suitable solvent may be coated and dried. In the case of UV curable resins, the resin itself or a solution thereof resulting from dissolution in a suitable solvent may be coated and irradiated with UV light for resin curing. In these solutions, various additives including antistatic agent, antioxidant and UV absorber may be further incorporated depending on specific requirements.

By these procedures described heretofore, a layered material comprising the substrate, the recording layer and the reflection layer both provided thereon, and if required the protective layer provided on the latter layer can be produced. By bonding two pieces of such a layered material together so as to arrange the recording layers inside relative to the respective substrate, a DVD-R type information-recording medium having two recording layers is produced. Bonding the two sheets of the layered material can be performed by using a slow-acting UV curable adhesive, hot melting or with use of an adhesive tape. However, by taking the possible damage to the recording layer and manufacturing cost into account, the method based on a slow-acting UV curable adhesive is most preferred. As the adhesive, solvent-free adhesives are preferably used. Though the adhesive can be coated by spray, spin or roll coating or screen printing, the screen printing method is most preferred. Another type of DVD-R type information-recording medium having a recording layer only on a single side can be produced by bonding a disk made of above described layered material to a protective disk having substantially the same dimensions as those of the disk with an adhesive in such a manner that the recording layer is arranged inside relative to the substrate.

According to the invention, information-recording is conducted with use of the information-recording medium thus prepared as follows. While the information-recording medium is rotated at a constant linear velocity (1.2 to 1.4 m/sec for the CD format), or at a constant angular velocity, a laser light for recording such as a semiconductor laser light is irradiated from the substrate side. The reason why information can be recorded is assumed as follows. The irradiated light acts to form a void at the interface between the recording layer and the reflection layer (The void formation proceeds with the deformation of the recording layer and/or the reflection layer.), or deform the substrate to rise, or to cause changes in the color or molecular association state in the recording layer, thereby leading to the change in refractive index. As the recording light, laser light in the visible spectrum is usually used. I.e., in CD-R, a semiconductor laser emitting a light having a central wavelength of 780 nm is used while, in the case of DVD-R, a semiconductor laser beam with an emitting wavelength of 600 to 700 nm (preferably 620 to 680 nm, and more preferably 630 to 660 nm) is used. Reproduction or read-out of the information thus recorded can be performed by rotating the information-recording medium at a constant linear velocity and irradiating the semiconductor laser light having the same wavelength as that used for recording from the substrate side and detecting the reflected light.

EXAMPLES

The present invention will be illustrated in greater detail with reference to the following Examples, but the invention should not be construed as being limited thereto.

Example 1

By using an injection-molding machine (made by Sumitomo Heavy Industries, Ltd.), a polycarbonate resin was fabricated into a disk substrate of 0.6 mm thickness and 120 mm diameter having a spiral groove (150 nm deep, 290 nm wide with 0.74 $\mu$m track pitch).

A coating mixture was prepared by dissolving Compound (I-5) and Oxonol Dye (II-1) at a mass ratio of 1:20 in 100 ml 2,2,3,3-tetrafluoropropanol to give a dye concentration of 1.5 weight %. The mixture was spread over the grooved surface of the substrate disk by spin coating to form a recording layer. The thickness of the dye-containing recording layer was 80 nm. Then, silver was sputtered on the dye-coated layer so as to give a 150 nm thick reflection layer. Thereafter, a UV curable resin (DaiCure Clear SD-318 made by Dainippon Ink and Chemicals, Inc.) was spin-coated on the reflection layer. A protective layer of about 7 $\mu$m thickness was formed by UV irradiation with a metal halide lamp. In this manner, Disk A having a thickness of 0.6 mm was obtained. Separately, Disk B of the same thickness and having no dye recording layer was obtained by sputtering silver directly on the substrate disk that had not been coated with a dye layer. To complete an information-recording disk, Disk B was bonded to Disk A by the following procedures. First, the protective layer of each of Disk A and B was coated with a slow-acting cationic polymerization-type adhesive (SK7000, a product of Sony Chemicals Corp.) by screen printing. The mesh density of the screen printing plate was 300 mesh/inch. Immediately after UV irradiation with use of a metal halide lamp, Disk A and Disk B were bonded together at the protective layer sides, and applied pressure from the upper and lower sides. After 5 min pressure application, the adhesive was cured perfectly to give a finished disk of 1.2 mm thickness.

Examples 2 To 8 and Comparative Examples 1 To 4

The procedures in Example 1 were repeated to produce DVD-R type disks of Examples 2 to 8 and Comparative Examples 1 to 4, except that Compound (I-5) and Oxonol Dye (II-1) were replaced to those listed in Table 1 that are associated with the invention without changing the mixing ratio and the use amount.
Evaluation as Optical Disks With use of an analyzer DDU 1000 (a product of Pulstec Industrial Co., Ltd.), signal recording was carried out in the DVD-R type optical disks of the aforementioned Examples and Comparative Examples by using a laser light of 655 nm wavelength (NA=0.6) at a linear velocity of 3.49 m/s, a modulation frequency of 4 MHz and a recording power of 9 mW. Thereafter, with use of a laser emitting the same wavelength light as that for recording, the depth of modulation of 14T and the jitter were measured.
Light-Fastness Each disk thus recorded was subjected to 48 hour irradiation with a Xe lamp (170,000 lux), and thereafter the depth of modulation and the jitter were again measured in the same manner as above.

The results of evaluation are given in Table 1.
Moisture- and Heat-Resistance

Each disk thus recorded was stored under an atmosphere of 80° C., 85% RH for 24 hours. Then, the depth of modulation and the jitter were again measured in the same manner as above.

The results of evaluation are given in Table 1.

(Examples 1 to 8) containing an organic dye associated with the invention and at least one compound represented by the aforementioned general formulae (I-1), (I-2), (I-3) or (I-4) in

TABLE 1

| | Compound used in the recording layer | Recording and Read-out Characteristic (Virgin) | | Recording and Read-out Characteristic (after Xe lamp irradiation) | | Recording and Read-out Characteristic (after storage under 80° C., 85% RH | |
|---|---|---|---|---|---|---|---|
| | | 14T | Jitter | 14T | Jitter | 14T | Jitter |
| Ex. 1 | (I-5) (II-1) | 62 | 8.0 | 66 | 9.0 | 52 | 14.0 |
| Ex. 2 | (I-10) (II-14) | 65 | 7.4 | 68 | 8.2 | 57 | 12.5 |
| Ex. 3 | (I-11) (II-18) | 62 | 7.8 | 68 | 8.8 | 54 | 13.0 |
| Ex. 4 | (I-11) (II-29) | 70 | 6.8 | 72 | 7.2 | 69 | 7.2 |
| Ex. 5 | (I-28) (II-33) | 67 | 7.2 | 73 | 7.8 | 65 | 7.8 |
| Ex. 6 | (I-33) (II-43) | 65 | 7.6 | 75 | 8.9 | 54 | 11.9 |
| Ex. 7 | (I-51) (II-29) | 67 | 6.9 | 69 | 7.1 | 65 | 7.1 |
| Ex. 8 | (I-54) (II-109) | 59 | 8.2 | 61 | 8.6 | 55 | 8.4 |
| Comp. Ex. 1 | (II-1) | 43 | 14.5 | 58 | Unmeasurable | 34 | Unmeasurable |
| Comp. Ex. 2 | (A) (II-14) | 41 | 17.2 | 50 | >20 | 32 | Unmeasurable |
| Comp. Ex. 3 | (B) (II-18) | 45 | 15.4 | 52 | >20 | 32 | Unmeasurable |
| Comp. Ex. 4 | (I-5) | 49 | 17.8 | 52 | 18.0 | Unmeasurable | Unmeasurable |

Comparative Compounds Used in Comparative Examples 2 to 4

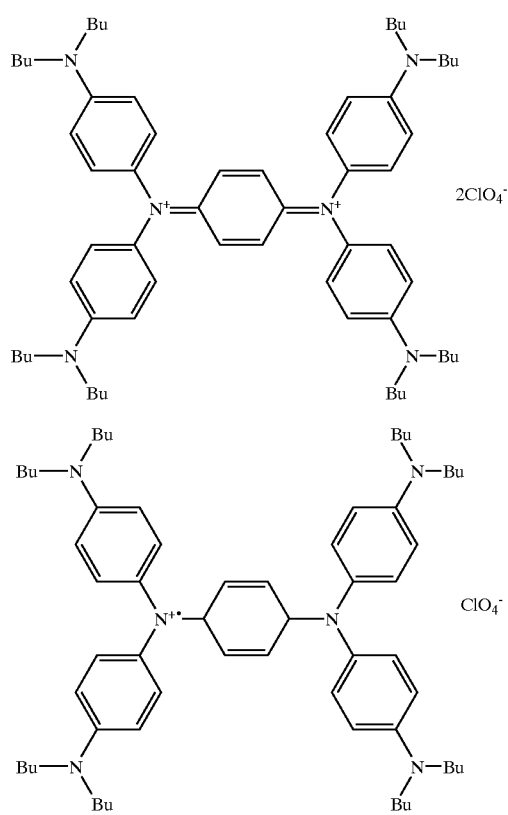

(C) Specific Example No. 13 given in Japanese Patent Laid-Open No. 138998/1999.

The above-cited Comparative Compounds (A) and (B) are generally known as quenchers, and Comparative Compound (C) is an already known compound. As is evident from the results shown in Table 1, the DVD-R type optical disks the recording layer exhibits a higher depth of modulation as well as a lower jitter than the comparative disks (Comparative Examples 1 to 4), thus giving superior recording and read-out characteristics. It has further been confirmed that the disks produced according to the invention exhibit preferable recording and read-out characteristics even after subjected to the light-fastness test and the moisture- and heat-resistance tests, indicating that they are provided with excellent light-fastness, as well as moisture- and heat-resistances.

According to the invention, an optical information-recording medium, which is capable of recording and reproducing information based on laser irradiation, having excellent recording and read-out characteristics and storage stability can be provided. Further, by using the optical information-recording medium, an information recording method having excellent recording and read-out characteristics and storage stability can be provided.

While the present invention has been described in detail and with reference to specific examples thereof, it will be apparent to one skilled in the art that various changes and modifications can be made therein without departing from the spirit and scope thereof.

What is claimed is:

1. An information-recording medium comprising a substrate having thereon a recording layer capable of recording information with laser light, said recording layer containing: at least one compound selected from the group consisting of compounds represented by the following general formulae (I-1), (I-2), (I-3) and (I-4); and an organic dye other than said compounds:

General formula (I-1)

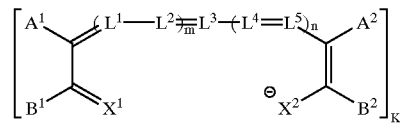

-continued

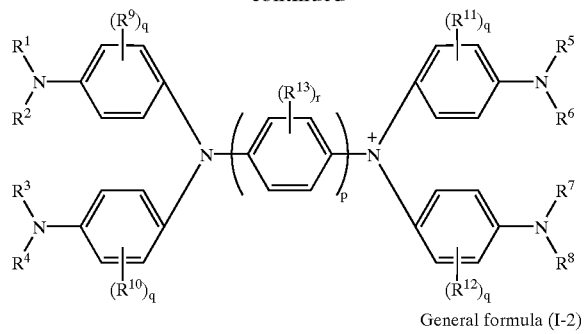

General formula (I-2)

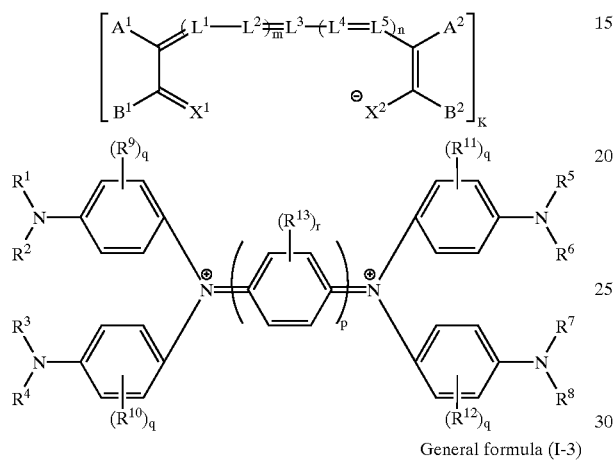

General formula (I-3)

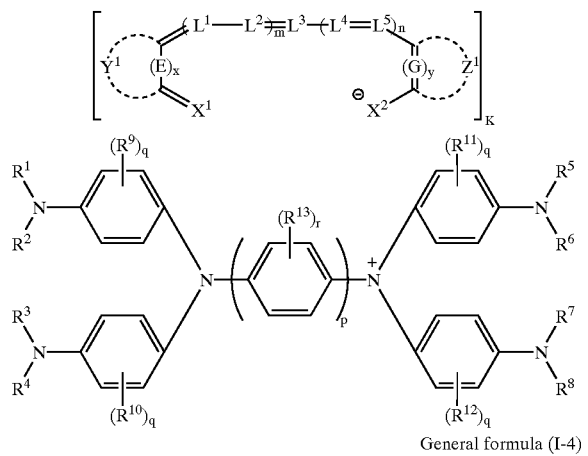

General formula (I-4)

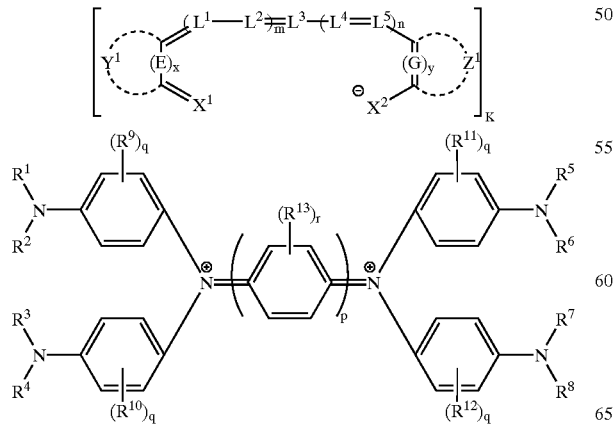

wherein $A^1$, $A^2$, $B^1$ and $B^2$ each independently represents a substituent; $Y^1$ and $Z^1$ each independently represents an atomic group necessary to form a carbocyclic or heterocyclic ring; E and G each independently represents an atomic group necessary to complete a conjugated double bond chain; $X^1$ represents =O, =NR or =C(CN)$_2$; $X^2$ represents —O, —NR or —C(CN)$_2$ (wherein R represents a substituent); $L^1$, $L^2$, $L^3$, $L^4$ and $L^5$ each independently represents a methine group which may be substituted; m and n each independently represents 0, 1 or 2; x and y each independently represents 0 or 1; and K represents an integer needed to neutralize the charge of the counter cation; $R^1$, $R^2$, $R^3$, $R^4$, $R^5$, $R^6$, $R^7$ and $R_8$ each independently represents a hydrogen atom or a substituent (wherein each pair of $R^1$ and $R^2$, $R^3$ and $R^4$, $R^5$ and $R^6$, and $R^7$ and $R_8$ may combine with each other to form a heterocyclic ring together with the nitrogen atom); $R^9$, $R^{10}$, $R^{11}$, $R^{12}$ and $R^{13}$ each independently represents a substituent; p represents 1 or 2; and q and r each independently represents an integer of 0 to 4, and wherein said organic dye is an oxonol dye, and said oxonol dye is represented by the following general formula (II),

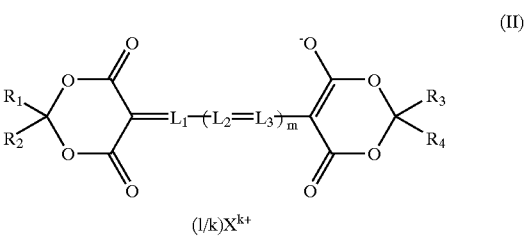

(II)

wherein $R^1$, $R^2$, $R^3$ and $R^4$ each independently represents a hydrogen atom, an alkyl group, and aryl group, and aralkyl group or a heterocyclic group; $L_1$, $L_1$ and $L_3$ each independently represents a methine group which may be substituted; m represents 0, 1, 2 or 3; and $X^{k+}$ represents a cation wherein k represents an integer of 1 to 10.

2. The information-recording medium according to claim 1, wherein $R^1$, $R^2$, $R^3$, $R^4$, $R^5$, $R^6$, $R^7$ and $R^8$ in general formulae (I-1), (I-2), (I-3) and (I-4) each is a hydrogen or halogen atom, an alkyl group having 1 to 8 carbon atoms, an alkenyl group having 2 to 8 carbon atoms, an alkynyl group having 2 to 8 carbon atoms, an aryl group having 6 to 10 carbon atoms, an aralkyl group having 7 to 10 carbon atoms, or an alkoxy group having 1 to 8 carbon atoms.

3. The information-recording medium according to claim 1, wherein $X^1$ is =O and $X^2$ is —O.

4. The information-recording medium according to claim 1, wherein $X^{k+}$ is a quaternary ammonium ion.

5. The information-recording medium according to claim 1, wherein $X^{k+}$ is an onium ion represented by the following general formula (II-1):

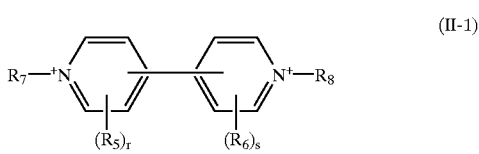

(II-1)

wherein $R_5$ and $R_6$ each independently represents a substituent, $R_7$ and $R_8$ each independently represents an alkyl group, an alkenyl group, an alkynyl group, an aralkyl group, an aryl group or a heterocyclic group; each pair of $R_5$ and $R_6$, $R_5$ and $R_7$, $R_6$ and $R_8$, and $R_7$ and $R_8$ may connect each other to form a ring; r and s each independently represents an integer of 0 to 4; and when r and s are not smaller than 2, the plural $R_5$'s and $R_6$'s may be the same or different.

6. A method of recording optical information, comprising recording information on an information-recording medium by irradiating a laser light having a wavelength in a range of 750 to 850 nm or a range of 600 to 700 nm, wherein said information recording medium is an information-recording medium as claimed in any one of claims 1 to 3, 7 or 8.

* * * * *